(12) United States Patent
Chen et al.

(10) Patent No.: US 8,971,683 B2
(45) Date of Patent: Mar. 3, 2015

(54) MULTIMODE OPTICAL FIBER AND SYSTEMS COMPRISING SUCH FIBER

(71) Applicant: Corning Incorporated, Corning, NY (US)

(72) Inventors: Xin Chen, Corning, NY (US); Ming Jun Li, Horseheads, NY (US); Dale Robert Powers, Campbell, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/060,938

(22) Filed: Oct. 23, 2013

(65) Prior Publication Data

US 2014/0119701 A1 May 1, 2014

Related U.S. Application Data

(60) Provisional application No. 61/720,683, filed on Oct. 31, 2012.

(51) Int. Cl.
*G02B 6/028* (2006.01)
*G02B 6/036* (2006.01)

(52) U.S. Cl.
CPC ............ *G02B 6/0288* (2013.01); *G02B 6/0281* (2013.01); *G02B 6/0365* (2013.01)
USPC ........... 385/124; 385/122; 385/123; 385/125; 385/126; 385/127; 385/128

(58) Field of Classification Search
CPC ............................ G02B 6/0281; G02B 6/0288
USPC .................................................. 385/122–128
See application file for complete search history.

(56) References Cited

U.S. PATENT DOCUMENTS

| | | | | |
|---|---|---|---|---|
| 3,989,350 | A * | 11/1976 | Cohen et al. | 385/124 |
| 6,363,195 | B1 * | 3/2002 | Abbott et al. | 385/123 |
| 7,336,877 | B2 * | 2/2008 | Bickham | 385/127 |
| 8,274,647 | B2 * | 9/2012 | Gholami et al. | 356/73.1 |
| 2009/0211303 | A1 * | 8/2009 | DiGiovanni et al. | 65/425 |
| 2010/0171945 | A1 * | 7/2010 | Gholami et al. | 356/73.1 |

* cited by examiner

*Primary Examiner* — Ryan Lepisto
*Assistant Examiner* — Guy Anderson
(74) *Attorney, Agent, or Firm* — Svetlana Short

(57) ABSTRACT

A multimode optical fiber includes: (i) a graded index glass core having a radius $R_1$ in the range of 20 microns to 50 microns, a maximum relative refractive index $\Delta_{1MAX}$ in the range between 0.5% and 3%; a graded index having a profile with (a) by an alpha ($\alpha$) parameter wherein $1.9 \leq \alpha \leq 2.2$, and (b) a deviation from the alpha profile in at least one region of the core, such that the difference in the refractive index delta of the core from that determined by the core alpha value, at the radius $R_1$ is less than 0.001, and (ii) a cladding surrounding and in contact with the core, wherein the fiber has an bandwidth greater than 5000 MHz-km at a wavelength $\lambda$ where $\lambda \geq 800$ nm.

22 Claims, 14 Drawing Sheets

B[0] = -0.0007, B[1] = 0.0007

MULTIMODE OPTICAL FIBER AND SYSTEMS COMPRISING SUCH FIBER

CROSS-REFERENCE TO RELATED APPLICATIONS

This application claims the benefit of priority under 35 U.S.C. §119 of U.S. Provisional Application Ser. No. 61/720,683 filed on Oct. 31, 2012 the content of which is relied upon and incorporated herein by reference in its entirety.

BACKGROUND

The present invention generally relates to fiber optic communication, and more particularly relates to a multimode optical fiber that may be particularly useful for use for wavelength division multiplexing across a wide bandwidth range.

High performance computing and data center installations typically require a large number of processor-to-processor interconnections, and using multimode (MM) optical fibers in these systems is cost-effective due to more relaxed alignment tolerances resulting from the large core diameters. Typical multimode optical fibers have graded index cores that are characterized by alpha values of about 2.1. Departures of core shapes from the ideal (or design) alpha values in multimode fibers are considered to be undesirable by those of skill in the art, because such departures result in wider variation of the delay associated with each mode group, and therefore in reduction of modal bandwidth. As a consequence, the manufacturing tolerances on the core shape (alpha values) are very strict.

SUMMARY

Applicants discovered that certain departures from of core shapes from the ideal (or design) alpha values in multimode fibers result in advantages such as, for example, increase in bandwidth peak, smaller difference in delay between higher and lower mode groups, and/or broader the bandwidth vs. wavelength.

According to some embodiments, a multimode optical fiber comprises:
(i) a graded index glass core having a radius $R_1$ in the range of 20 microns to 50 microns, a maximum relative refractive index $\Delta_{1MAX}$ in the range between 0.5% and 3%; a graded index having a profile with (a) an alpha (α) parameter wherein $1.9 \leq \alpha \leq 2.2$, and (b) a deviation from the alpha profile in at least one region of the core, such that the difference in the refractive index delta of the core from that determined by the core alpha value, at the radius $R_1$ is less than 0.0015%, and
(ii) a cladding surrounding and in contact with the core, wherein the fiber has a bandwidth greater than 5000 MHz-km at a wavelength λ where λ≥800 nm.

According to some embodiments, a multimode optical fiber comprises:
(i) a graded index glass core having a diameter in the range of 40 microns to 100 microns, a maximum relative refractive index $\Delta_{1MAX}$ in the range between 0.5% and 2%; a graded index having a profile with (a) an alpha (α) parameter wherein $1.9 \leq \alpha \leq 2.2$, and (b) at least one deviation from alpha parameter B[n], where n is an integer and $1 \leq n \leq 10$ and wherein and wherein for said for at least one value of n, B[n] is $0.1 \times 10^{-4} \leq |B[n]| \leq 7 \times 10^{-3}$, and $$B[n] = \int_0^1 H(x') \cdot P_n(x') \cdot dx',$$

where H is a normalized non-alpha contribution to the refractive index profile, and $P_n$ are orthogonal functions; and
(ii) a cladding surrounding and in contact with the core, wherein the fiber has a bandwidth greater than 5000 MHz-km at a wavelength λ where λ≥800 nm.

According to some embodiments, a multimode optical fiber comprises:
(i) a graded index glass core 20 having an outer radius $R_1$ in the range of 20 microns to 50 microns, a maximum relative refractive index $\Delta_{1MAX}$ in the range between 0.5% and 3%; a graded index having a profile with
an alpha (α) parameter wherein $1.9 \leq \alpha \leq 2.2$, and
at least one deviation in at least one region of the core from that determined by alpha profile, said at least one deviation being determined by a parameter B[n], where n is an integer and $1 \leq n \leq 10$, and B[n] has a non-zero value, such that there an absolute difference in the relative refractive index delta of the core in every region of the core corresponding to radii r where r is $0.1R_1 < r < 0.9R_1$ from that determined only by the alpha (α) parameter is not greater than 0.002%; and
(ii) a cladding 60 surrounding and in contact with the core 20. Preferably, this fiber has a bandwidth greater than 5000 MHz-km at a wavelength λ where λ≥800 nm. Preferably the absolute difference in the relative refractive index delta of the core in every region of the core corresponding to the core radii r where r is $0.1R_1 < r < 0.9R_1$ from that determined only by the alpha (α) parameter is not greater than 0.0017%, and more preferably less than 0.0015%. Preferably, the maximum relative refractive index $\Delta_{1MAX}$ is between 0.5% and 2%.

According to some embodiments, a multimode optical fiber comprises:
(i) a graded index glass core having an outer radius $R_1$ in the range of 20 microns to 50 microns, a maximum relative refractive index $\Delta_{1MAX}$ in the range between 0.5% and 3%; a graded index having a profile with
(a) an alpha (α) parameter wherein $1.9 \leq \alpha \leq 2.2$, and
(b) a deviation from the alpha profile in at least one region of the core, such that at the radius $R_1$, the difference in the relative refractive index delta of the core from that determined by the core alpha parameter is less than 0.0015% (and preferably less than 0.001%); and
(ii) a cladding surrounding and in contact with the core, wherein the fiber has a bandwidth greater than 5000 MHz-km at a wavelength λ where λ≥800 nm. In some embodiments the maximum relative refractive index $\Delta_{1MAX}$ is in the range between 0.5% and 2% and the core numerical aperture is 0.16 to 0.26.

According to some embodiments, a multimode optical fiber comprises:
(i) a graded index glass core having a diameter in the range of 40 microns to 100 microns, a maximum relative refractive index $\Delta_{1MAX}$ is between 0.5% and 3% (preferably 0.5% to 2%); a graded index having a profile with an alpha (α) parameter such that $1.9 \leq \alpha \leq 2.2$ and at least one non-alpha parameter B[n], where B[n] defines a deviation of the core's index profile from that determined by the alpha (α) parameter, where n is an integer and 1≤n≤10 and wherein for at least one value of n, the parameter B[n] is non zero and $0.1 \times 10^{-4} \leq |B[n]| \leq 7 \times 10^{-3}$; and (ii) a cladding surrounding and in contact with the core, wherein the fiber has an overfilled bandwidth greater than 5000 MHz-km at a wavelength λ where λ≥800 nm. In some embodiments, 1<n≤4. Preferably, at the core outer radius $R_1$ the absolute difference in the relative refractive index delta of the core from that determined only by the core alpha parameter α is less than 0.0015%, and more preferably less than 0.001%.

According to some embodiments a multimode optical fiber 100 comprises:

(i) a graded index glass core 20 having an outer radius $R_1$ in the range of 20 microns to 50 microns, a maximum relative refractive index $\Delta_{1MAX}$ is between 0.5% and 3%; a graded index having a profile with an alpha (α) parameter wherein 1.9≤α≤2.2 and at least one deviation from an alpha profile, the deviation being determined by a parameter B[n], where n is an integer, 1≤n≤10, and the parameter B[n] has a non-zero value; and a difference in the relative refractive index delta of the core from that determined by the core alpha (α) parameter is not zero at some radii, and is zero at least two radial locations, where
   a. one core radius r where the difference in the refractive index delta is zero is $0.2R_1 > r > 0.85R_1$; and
   b. another radial location where the difference in the refractive index delta is zero corresponds to a core radius r where r is $0.8R_1 < r < R_1$, and (ii) a cladding 60 surrounding and in contact with the core 20, wherein the fiber has an overfilled bandwidth greater than 5000 MHz-km at a wavelength λ where λ≥830 nm. Preferably the maximum relative refractive index $\Delta_{1MAX}$ is between 0.5% and 2%.

According to some embodiments an multimode optical fiber 100 comprises:

(i) a graded index glass core 20 having an outer radius $R_1$ in the range of 20 microns to 50 microns, a maximum relative refractive index $\Delta_{1MAX}$ is between 0.5% and 3%; a graded index having a profile with an alpha (α) parameter wherein 1.9≤α≤2.2 and at least one deviation from an alpha profile such that the difference in the relative refractive index delta of the core from that determined by the core alpha (α) parameter is not zero at some radial locations, and is zero at two or more radial locations, where
   a. one core radius r where difference in the refractive index delta is zero is $0.2R_1 < r < 0.85R_1$, and
   b. another radial location where the difference in the refractive index delta is zero corresponds to a core radius r where r is $0.8R_1 < r < R_1$, and (ii) a cladding 60 surrounding and in contact with the core 20, wherein the fiber has an overfilled bandwidth greater than 5000 MHz-km at a wavelength λ where λ≥800 nm.

According to some embodiments, the core is constructed to have a core profile with a deviation from that defined only by the alpha parameter in at least one region of the core, such that for all radii r, where $0.9R_1 < r < R_1$ the maximum absolute difference in the refractive index delta of the core from that determined by the core alpha parameter value is less than 0.0015%, and preferably less than 0.0012%. According to some embodiments the core is constructed to have a core profile with a deviation in at least one region of the core from that determined by the core alpha parameter, such that the maximum absolute difference in the refractive index delta of the core from that determined by the core alpha parameter value at the core radius $r=R_1$ is less than 0.001%.

Preferably, the core has a numerical aperture NA, where 0.16<NA<0.36. According to some embodiments the cladding includes an inner annular portion with relative refractive index delta $\Delta_2$, measured at the radial location where the first derivative $d(\Delta/\Delta_{1MAX})/d(r/R_1)$, is equal to −2.5.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 4B is an expanded version of FIG. 4A;

FIG. 6B is an expanded portion of FIG. 6A;

DETAILED DESCRIPTION

Figure 1A:
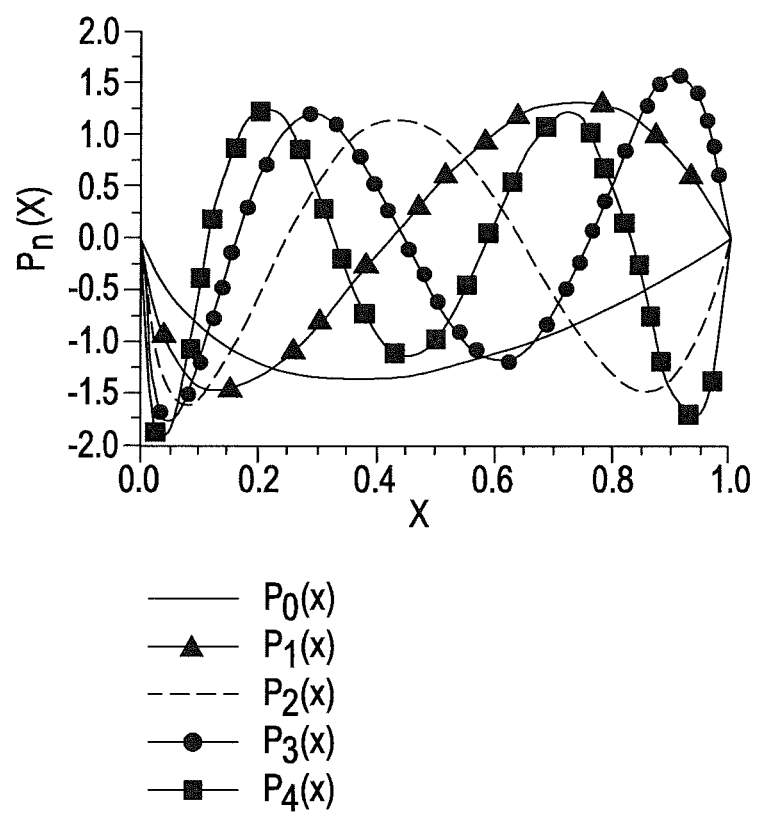
FIG. 1A is a plot of the first five orthogonal polynomials ($P_0(x)$ through $P_4(x)$) for defining a fiber core refraction index correction to a standard core alpha profile (i.e., for defining deviation from the standard core alpha profile).

Reference will now be made in detail to the present preferred embodiments, examples of which are illustrated in the accompanying drawings. Whenever possible, the same reference numerals will be used throughout the drawings to refer to the same or like parts.

The "refractive index profile" is the relationship between refractive index or relative refractive index and waveguide fiber radius.

The "relative refractive index" (also referred to herein as relative refractive index delta, is defined as $\Delta(r)=[n(r)^2-n_{cl}^2)]/2n(r)^2$, where $n(r)$ is the refractive index at the radial distance r from the fiber's centerline, and $n_{cl}$ is the average refractive index of the outer cladding at an operating wavelength, for example wavelength of 800 nm or 1550 nm. At the core center, the relative refractive index delta is $\Delta=[n_0^2-n_{cl}^2)]/2n_0^2$, where $n_0$ is the refractive index at the center of the core). Unless otherwise specified, when the fiber outer cladding diameter is 125 microns, $n_{cl}$ is determined by averaging the refractive index over a radius range between about 45 and 55 microns, e.g. $n_{cl} = \sum_{i=1}^{N_{dp}} n_i(r)/N_{dp}$ where $N_{dp}$, there are the number of data points in the range $45 \leq r \leq 55$ microns, and $N_{dp}$ at least 2. The % $\Delta$ is defined by the equation: % $\Delta=100\times\Delta$. In embodiments where the fiber outer cladding diameter, $2*R_4$, is not equal to 125 microns, $n_{cl}$ is determined by averaging the refractive index over a radius range between about $0.72*R_4$ and $0.88*R_4$. In one aspect, the cladding comprises essentially pure silica. In other aspects, the cladding may comprise silica with one or more dopants (e.g., $GeO_2$, $Al_2O_3$, $P_2O_5$, $TiO_2$, $ZrO_2$, $Nb_2O_5$ and/or $Ta_2O_5$) which increase the index of refraction, in which case the cladding is "up-doped" with respect to pure silica. The cladding may also comprise silica with one or more dopants (e.g., F and/or B) which decrease the index of refraction, in which case the cladding "down-doped" with respect to pure silica. As used herein, the relative refractive index is represented by delta ($\Delta$) and $\Delta$ % values are typically given in units of "%," unless otherwise specified. In cases where the refractive index of a region is less than that of the cladding, the relative refractive index is negative and is referred to as having a depressed index, and is calculated at the point at which the relative index is most negative unless otherwise specified. In cases where the refractive index of a region is greater than the refractive index of silica, the relative refractive index is positive and the region can be said to be raised or to have a positive index, and is calculated at the point at which the relative index is most positive, unless otherwise specified.

An "up-dopant" is herein considered to be a dopant which has a propensity to raise the refractive index relative to pure undoped $SiO_2$. A "down-dopant" is herein considered to be a dopant which has a propensity to reduce the refractive index relative to pure undoped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

As used herein, the 850 nm window is defined as the wavelength range from 800 nm to 900 nm, or a subset of this wavelength range. For example, from 840 nm to 860 nm, 840 nm to 870 nm. Also, as used herein, the 1060 nm window is defined as the wavelength range from 1000 nm to 1120 nm, or a subset of this wavelength range. For example, from 1040 to 1080-nm, or 1050 to 1070 nm.

As used herein, numerical aperture of the fiber means numerical aperture as measured using the method set forth in TIA SP3-2839-URV2 FOTP-177 IEC-60793-1-43 titled "Measurement Methods and Text Procedures-Numerical Aperture."

The term graded index, "α-profile" or "alpha profile," as used herein, refers to a relative refractive index profile, expressed in terms of $\Delta$ where r is the radius and which follows the equation, $$\Delta(r) = \Delta_0\left[1-\left(\frac{r}{R_1}\right)^\alpha\right],$$

where $\Delta_0$ is the relative refractive index extrapolated to r=0, $R_1$ is the radius of the core (i.e. the radius at which $\Delta(r)$ is zero (see FIG. 1)), and α is an exponent which is a real, positive number. For a step index profile, the alpha value is greater than or equal to 10. For a graded index profile, the alpha value is less than 10. The term "parabolic," as used herein, includes substantially parabolically shaped refractive index profiles which may vary slightly from an a value of 2.0 at one or more points in the core, as well as profiles with minor variations and/or a centerline dip. The modeled refractive index profiles of at least some comparative fibers described herein have graded index cores which are perfect alpha profiles. An actual fabricated fiber that corresponds to the modeled fiber with a perfect alpha profile may however include features such as dips or spikes at the centerline and/or a small diffusion tail at the outer interface of the core. However, in such manufactured multimode fibers accurate values of alpha and $\Delta_0$ may be obtained by numerically fitting the measured relative refractive index profile to an alpha profile over the radius range from $0.1R_1 \leq r \leq 0.9R_1$. In ideal graded index fibers with perfect alpha profiles and with no imperfections such as dips or spikes at the centerline, $\Delta_0 = \Delta_{1MAX}$, where $\Delta_{1MAX}$ is the maximum refractive index of the core. In other cases, with fibers that have dips or spikes at the centerline, the value from $\Delta_0$ obtained from the numerical fit from $0.1R_1 \leq r \leq 0.9R_1$ may be greater or less than $\Delta_{1MAX}$.

The term "non-alpha feature" (also referred herein as the non-alpha parameter(s), beta parameter(s), or B[n]), refers to an additional core parameter(s) that defines the deviation (i.e., departure) of the core refractive index profile from that determined only by its alpha parameter's value. The refractive index deviation of the core due to contributions from non alpha parameters B[n] (where n≥1) is also referred herein as the refractive index correction.

According to one embodiment, the following expansion technique that characterizes fiber core profile's departure from the alpha profile. The expansion set described below can characterize an arbitrary function describing a core index profile using a set of orthogonal functions (polynomials) between 0 and outer radius of the core $R_1$, or between 0 and 1 for a normalized parameter defined as $x=(r/R_1)^2$. The n orthogonal functions described herein, where the normalized core values are between 0 and 1 are:

$$P_n(x) = \left( \sum_{i=0}^{n-1} A[n,i] \cdot x^n \right) \cdot x \cdot \ln(x) \quad (1)$$

where $P_n(x)$ satisfies the following requirements, $$\langle P_n(x), P_m(x) \rangle = \int_0^1 P_n(x') \cdot P_n(x') dx' = \begin{cases} 0, & \text{when } n \neq m \\ 1, & \text{when } n = m \end{cases} \quad (2)$$

and x' is a dummy variable for integration.

Furthermore, according to at least some of the embodiments described herein, the functions $P_n(x)$ are equal to zero value when x is 0 and when x is 1.

However, according to at some of the embodiments the functions $P_n(x)$ are defined to be equal to zero value when x is 0 and also when x>0.9 (e.g., when x>0.95 or 0.98. In these exemplary fiber embodiments the difference in the relative refractive index delta (% $\Delta$) of the fiber core from that determined by the core alpha parameter's value, at the radius $R_1$ is preferably not greater than 0.0015% (for example, less than 0.00125%, and preferably less than 0.001%). That is, (core $\Delta$ of these fiber embodiments)−(core $\Delta$ of the similar fiber that has the pure alpha core)=0.0015%, at the radius $R_1$. It is noted that the integration variable x', when equal to 1, corresponds to the edge of the core (i.e., radius $R_1$). The orthogonal functions $P_n(x)$ are used to prescribe the deviation of the refractive index delta of the core from with a core with a pure alpha profile.

The orthogonal functions $P_n(x)$ are used to prescribe the deviation of the refractive index delta of the core from with a core with a pure alpha profile. The polynomial coefficients, A[n,i] of equation 1, for the first 10 functions $P_n(x)$, i.e., $P_0(x)$ to $P_{10}(x)$, are listed in Table A. Plots of first five functions $P_0(x)-P_4(x)$ are provided in FIG. 1A. More specifically, FIG. 1A is a plot of the first five orthogonal polynomials ($P_0(x)$ through $P_4(x)$) for defining a core refractive index correction to a standard core alpha profile—i.e., for describing the deviation or departure of the core's profile (in terms of relative refractive index) from the one defined only by the alpha parameter. Table A provides the coefficients for first ten orthogonal polynomials.

TABLE A

| A[n, 0] | A[n, 1] | A[n, 2] | A[n, 3] | A[n, 4] | A[n, 5] | A[n, 6] | A[n, 7] | A[n, 8] | A[n, 9] |
|---|---|---|---|---|---|---|---|---|---|
| 3.674235 | 0 | 0 | 0 | 0 | 0 | 0 | 0 | 0 | 0 |
| 7.949433 | −18.8431 | 0 | 0 | 0 | 0 | 0 | 0 | 0 | 0 |
| 13.54535 | −75.4887 | 84.72897 | 0 | 0 | 0 | 0 | 0 | 0 | 0 |
| 20.52056 | −196.732 | 499.5175 | −363.359 | 0 | 0 | 0 | 0 | 0 | 0 |
| 28.91456 | −416.337 | 1767.727 | −2839.75 | 1522.765 | 0 | 0 | 0 | 0 | 0 |
| 38.76188 | −775.164 | 4837.076 | −12749.3 | 14854.16 | −6298.65 | 0 | 0 | 0 | 0 |
| 50.09453 | −1321.44 | 11257.04 | −42937.6 | 80982.11 | −73741 | 25840.84 | 0 | 0 | 0 |
| 62.94272 | −2110.72 | 23388.11 | −120244 | 324491.7 | −473558 | 353230.6 | −105435 | 0 | 0 |
| 77.33521 | −3206.23 | 44643.62 | −295357 | 1064007 | −2202712 | 2613065 | −1648828 | 428537.7 | 0 |
| 93.29813 | −4678.88 | 79763.81 | −657067 | 3020668 | −8285247 | 13848464 | −1.4E+07 | 7547436 | −1736849 |

Using Table A, we can obtain $P_n(x)$ for a given n. For example, for n=1:

$$P_1(x) = 3.674235 \cdot x \cdot \ln(x)$$

For example, when n=3, $$P_3(x) = (13.54535 - 75.4887 \cdot x + 84.72897 \cdot x^2) \cdot x \cdot \ln(x)$$

The traditional core alpha profile is defined by the following equation $$n^2(r) = n_{core}^2 [1 - \Delta(r/R_1)^\alpha] \quad (3)$$

where n is the refractive index of the core as a function of core radius, and $n_{core}$ is maximum core refractive index (the refractive index at the center of the modeled core is also referred to as $n_0$ herein, and typically $n_{core} = n_0$). When the value for the alpha parameter is 2 (i.e., $\alpha=2$), the relative refractive index profile of the fiber core is parabolic. With the expansion technique described herein, the term $(r/R_1)^\alpha$ ($=x^{\alpha/2}$) is replaced by a more generalized function that includes higher order terms, $$G(x) = x^{\alpha_0/2} + \sum_{n=0} B[n] \cdot P_n(x) \quad (4)$$

where $\alpha_0$ is a given alpha value. Thus, the index profile (index values n(r) of the core) is described by the following equation, $$n^2(r) = n_{core}^2 [1 - \Delta \cdot G(x)] \quad (5)$$

We also define $H(x) = G(x) - x^{\alpha_0/2}$, and H(x) is the normalized non-alpha contribution to the relative refractive index profile of the core (i.e., the normalized deviation from the pure alpha profile). The lowest order term for the expansion is essentially a correction for the core profile's deviation from that determined by its alpha value, since $$x^{\alpha/2} - x^{\alpha_0/2} \approx x^{\alpha_0/2} \cdot \ln(x)\left(\frac{\alpha}{2} - \frac{\alpha_0}{2}\right) \approx \frac{1}{2}(\alpha - \alpha_0) \cdot x \cdot \ln(x) \quad (6)$$

Therefore, the lowest order non-alpha terms (or parameters), B[n], describing the fiber core's refractive index profile start when n is equal to 1 or higher. Applicants discovered that there are many ways to express an alpha profile using the parameter $\alpha_0$ and B[0]. For a given $\alpha_0$, the actual alpha value for a given profile can be modified by B[0], which causes a correction to the alpha value as described by equation (6). According to at least some embodiments, during our search for optimal profile, we start with certain $\alpha_0$ value and various sets of parameters for non-alpha contributions B[n], and then evaluate the fiber's performance.

Applicants discovered that deviations from the alpha profile shape defined by the non-alpha parameters B[1], B[2], B[3], etc., result in higher (larger) peak bandwidth but often at a different (non-optimum) peak wavelength. Applicants also discovered that a change in the B[0] parameter brings the peak bandwidth to desired values at the desired operating wavelength, such as 850 nm, 980 nm or 1060 nm, etc. (Note, that Peak Bandwidth is the maximum bandwidth achieved. See, for example the plot of FIG. 5.) For example, according to one embodiment the non-alpha parameters defined by B[n] are: B[0]=−0.0007; B[1]=0.0007; B[2]=0.0; B[3]=0.0; B[4]=0.0.

To make the specification of the fiber core's refractive index profile unique, we can force B[0] to be zero by choosing a suitable a value. Note that the lowest order expansion function $P_1(x)$ takes the form, $$P_1(x)=3.674235 \cdot x \cdot \ln(x) \quad (7)$$

Therefore, for this exemplary embodiment the expansion set with non-zero B[0] term and the original alpha value of $\alpha_0$, is equivalent to a new expansion set with alpha value $\alpha$, $$\alpha=\alpha_0+7.348506 \cdot B[0] \quad (8)$$

The new B[0] is now zero, while all other B[n] are kept the same.

Also when the normalized non-alpha contribution of an index profile H(x) is obtained, one can calculate the B[n] using the following equation, $$B[n] = \int_0^1 H(x') \cdot P_n(x') \cdot dx' \quad (9)$$

According to at least some embodiments of the present invention a multimode optical fiber 100 comprises: (i) a graded index glass core 20 having a radius $R_1$ in the range of 20 microns to 50 microns, a maximum relative refractive index $\Delta_{1MAX}$ in the range between 0.5% and 2%; a graded index having a profile with (a) an alpha ($\alpha$) parameter wherein $1.9 \leq \alpha \leq 2.2$, and (b) a deviation from the alpha value in at least one region of the core, such that the difference in the relative refractive index delta of the core from that determined only by the core alpha value, at the outer core radius $R_1$ is less than 0.0015%, and (ii) a cladding 60 surrounding and in contact with the core, wherein the fiber has an overfilled bandwidth greater than 5000 MHz-km at a wavelength $\lambda$ where $\lambda \geq 850$ nm.

According to at least some embodiments of the present invention a multimode optical fiber 100 comprises:

(i) a graded index glass core 20 having a diameter in the range of 40 microns to 100 microns, a maximum relative refractive index $\Delta_{1MAX}$ in the range between 0.5% and 2%; a graded index having a profile with an alpha ($\alpha$) parameter wherein $1.9 \leq \alpha \leq 2.2$ (for example between 1.9 and 2.1) and at least one deviation from alpha determined by the parameter(s) B[n], where n is an integer and $1 \leq n \leq 10$ and wherein B[n] has a non-zero value and $0.1 \times 10^{-4} \leq |B[n]| \leq 7 \times 10^{-3}$, and $$B[n] = \int_0^1 H(x') \cdot P_n(x') \cdot dx',$$

where H is a normalized non-alpha contribution to the refractive index profile, and $P_n$ are orthogonal functions; and (ii) a cladding 60 surrounding and in contact with the core 20, wherein the fiber has an overfilled bandwidth greater than 5000 MHz-km at a wavelength $\lambda$ where $\lambda \geq 830$ nm. In some embodiments $\lambda=850$ nm 980 nm, 1060 nm, 1120 nm, 1310 nm, 1350 nm, or 1550 nm.

Note that the non-alpha parameter B[n] is also referred to herein as the "deviation from alpha" parameter, It is noted that n is an integer and $1 \leq n \leq 10$ and that B[n] represents departure or deviation of the core's refractive index from that characterized by a pure alpha profile. That is, the parameter B[n] provides a refractive index correction to the standard alpha profile. In some embodiments $1 \leq n \leq 5$.

According to some embodiments of the invention a multimode optical fiber 100 comprises:

(i) a graded index glass core 20 having a diameter in the range of 40 microns to 100 microns, a maximum relative refractive index $\Delta_{1MAX}$ in the range between 0.5% and 2%; a graded index having a profile with an alpha ($\alpha$) parameter wherein $1.9 \leq \alpha \leq 2.2$ and at least one deviation from alpha parameter B[n] (also referred to a non-alpha parameter herein), where n is an integer and $1 \leq n \leq 10$, said at least one deviation B[n] has a non-zero value, such that at the radius $R_1$ the absolute difference in the relative refractive index delta of the core from that determined by the core alpha value in at least one region of the core is less than 0.0015%, (and preferably less than 0.0001%, and more preferably less than 0.0005%) and (ii) a cladding 60 surrounding and in contact with the core 20, wherein the fiber has an overfilled bandwidth greater than 5000 MHz-km at a wavelength $\lambda$ where $\lambda \geq 830$ nm.

According to some embodiments of the invention a multimode optical fiber 100 comprises a graded index glass core 20 having an outer radius $R_1$ in the range of 20 microns to 50 microns, a maximum relative refractive index $\Delta_{1MAX}$ in the range between 0.5% and 2%; a graded index having a profile with an alpha ($\alpha$) parameter wherein $1.9 \leq \alpha \leq 2.2$ and at least one deviation from alpha parameter B[n], where n is an integer and $1 \leq n \leq 10$. At least one deviation B[n] has a non-zero value such that in every region of the core corresponding to a core radius $0.1R_1 < r < 0.9R_1$ the absolute difference in the relative refractive index delta of the core from that determined by the core alpha value is not greater than 0.002%, (and preferably not greater than 0.0017%, and more preferably less than 0.0015%, for example 0.001% or less). A cladding 60 surrounds and is in contact with the core 20. Preferably, this fiber has an overfilled bandwidth greater than 5000 MHz-km at a wavelength λ where λ≥830 nm.

According to some embodiments of the invention a multimode optical fiber 100 comprises:

(i) a graded index glass core 20 having a diameter in the range of 40 microns to 100 microns, a maximum relative refractive index $\Delta_{1MAX}$ in the range between 0.5% and 2%; a graded index having a profile with an alpha (α) parameter wherein 1.9≤α≤2.2 and at least one deviation from alpha parameter B[n], where n is an integer and 1≤n≤10. This one deviation B[n] has a non-zero value. In this optical fiber, for at least one core radius where $0.2R_1<r<0.85R_1$, the difference in the relative refractive index delta of the core from that determined only by the core's alpha value, is zero. The a cladding 60 surrounds and is contact with the core 20. The fiber 100 has an overfilled bandwidth greater than 5000 MHz-km at a wavelength λ where λ≥800 nm (e.g., >830 nm).

According to some embodiments of the invention a multimode optical fiber 100 comprises:
a graded index glass core 20 having an outer radius $R_1$ in the range of 20 microns to 50 microns, a maximum relative refractive index $\lambda_{1MAX}$ in the range between 0.5% and 2%; a graded index having a profile with an alpha (α) parameter wherein 1.9≤α≤2.2 (for example between 1.9 and 2.1) and at least one deviation from alpha profile determined by the parameter B[n], where n is an integer and 1≤n≤10. The parameter B[n] has a non-zero value; and the difference in the refractive index delta of the core from that determined by the core's alpha value is not zero in at least some core radial locations, and is zero in at least two radial locations. One radial location where the difference in the relative refractive index delta of the core from that determined by the core's alpha value is zero corresponds to at least one core radius r where $0.2R_1<r<0.85R_1$. Another radial location when the difference in the refractive index delta of the core from that determined by the core's alpha value is zero corresponds to the core radius r where $0.8R_1<r<R_1$. The cladding 60 surrounds and in is contact with the core 20. The fiber 100 has an overfilled bandwidth greater than 5000 MHz-km at a wavelength λ where λ≥800 nm (e.g., λ≥830 nm).

According to some embodiments of the invention a multimode optical fiber 100 comprises a graded index glass core 20 having an outer radius $R_1$ in the range of 20 microns to 50 microns, a maximum relative refractive index $\Delta_{1MAX}$ in the range between 0.5% and 2%; a graded index having a profile with an alpha (α) parameter wherein 1.9≤α≤2.2 (for example between 1.9 and 2.1) and at least one parameter B[n], where n is an integer and 1≤n≤10. The least one parameter B[n] has a non-zero value; and a difference in the refractive index delta of the core from that determined by the core alpha value is (i) not zero at some radii and (ii) zero in at least one radial location. More specifically, the difference in the refractive index delta of the core from that determined by the core alpha value is zero for some value of r, when $0.2R_1<r<0.85R_1$. More specifically, in this embodiment the relationship between the refractive index delta of the core and the radius r is chosen such that the difference in the relative refractive index delta of the core from that determined by the core's alpha is: (a) zero at $r<0.05R_1$, (b) exhibits a first local minimum or maximum when $0.2R_1<r<0.5R_1$, (c) has another local minimum or maximum value when $0.5R_1<r<R_1$, and (d) is zero after it reaches said first minimum or maximum and before it reaches another minimum or maximum. Preferably, the fiber has an overfilled bandwidth greater than 5000 MHz-km at a wavelength λ where λ≥830 nm.

Preferably the fiber 100 has an overfilled bandwidth greater than 5000 MHz-km at a wavelength λ where λ≥830 nm. According to some embodiments λ=850 nm. According to other embodiments λ=1310 nm. According to other embodiments λ=980 nm. According to other embodiments λ=1060 nm. According to other embodiments λ=1350 nm, or 1550 nm.

According to some embodiments, the fiber 100 has an overfilled bandwidth greater than 10000 MHz-km at a wavelength λ where λ≥850 nm (for example 980 nm, 1060 nm, 1120 nm, 1310 nm, or 1350 nm).

Various embodiments of a multimode optical fiber exhibiting a core diameter which provides enhanced performance characteristics are provided. Multimode optical fiber is disclosed having a graded index glass core and a cladding surrounding and in contact with the core. According to the embodiments disclosed herein the core diameter is about 40 microns to about 100 microns. In some exemplary embodiments the core diameter is between about 60 microns and about 65 microns, which is comparable to the core diameter of commercially available 62.5 micron multimode fiber. In other exemplary embodiments the core diameter is between about 47 and about 53 microns, which is comparable to the core diameter of commercially available 50 micron multimode fiber. In some exemplary embodiments the core diameter is between about 70 and 80 microns, which enables larger alignment tolerances for coupling to optical transceivers. In other exemplary embodiments the core diameter is between about 41 and about 50 microns, which reduces the number of propagating modes in the fiber and enables higher bandwidth. Some exemplary core diameters are 40 microns, 45 microns, 50 microns, 60 microns, 65 microns, 70 microns, 75 microns, and 80 microns.

In some the embodiments described herein the cladding includes a depressed-index annular portion. In some embodiments the cladding comprises an inner annular portion surrounding and in contact with the core, a depressed-index annular portion surrounding the inner annular portion, and an outer annular portion surrounding and in contact with the depressed-index annular portion. In other embodiments the fiber cladding does not include the depressed-index annular portion.

The fiber further has an overfilled bandwidth greater than 5000 MHz-km at 850 nm, and in some embodiments greater than 7500 MHz-km at 850 nm, or even greater than 10000 MHz-km at 850 nm. In some embodiments the fiber further has an overfilled bandwidth greater than 5000 MHz-km at 980 nm, and in some embodiments the fiber further has an overfilled bandwidth greater than even 7500 MHz-km at 980 nm or even greater than 10000 MHz-km at 980 nm. In some embodiments the fiber further has an overfilled bandwidth greater than 5000 MHz-km at 1060 nm, and in some embodiments the fiber further has an overfilled bandwidth greater than even 7500 MHz-km at 1060 nm, or even greater than 10000 MHz-km at 1060 nm. In some embodiments the fiber further has an overfilled bandwidth greater than 5000 MHz-km at 1310 nm, and in some embodiments the fiber further has an overfilled bandwidth greater than 7500 MHz-km at 1310 nm. In some embodiments, the overfilled bandwidth is greater than 5000 MHz-km at all wavelengths in the range from 850 to 1060 nm, and in preferred embodiments, is greater than 5000 or even 7500 MHz-km at all wavelengths in the range from 850 to 1060 nm. (Note, 1 GHz-km is equal to 1000 MHz-km.) In some embodiments, the overfilled bandwidth is greater than 5000 MHz-km at 1310 nm. In some embodiments, the overfilled bandwidth is greater than 5000 MHz-km at 1350 nm.

Figure 1B:
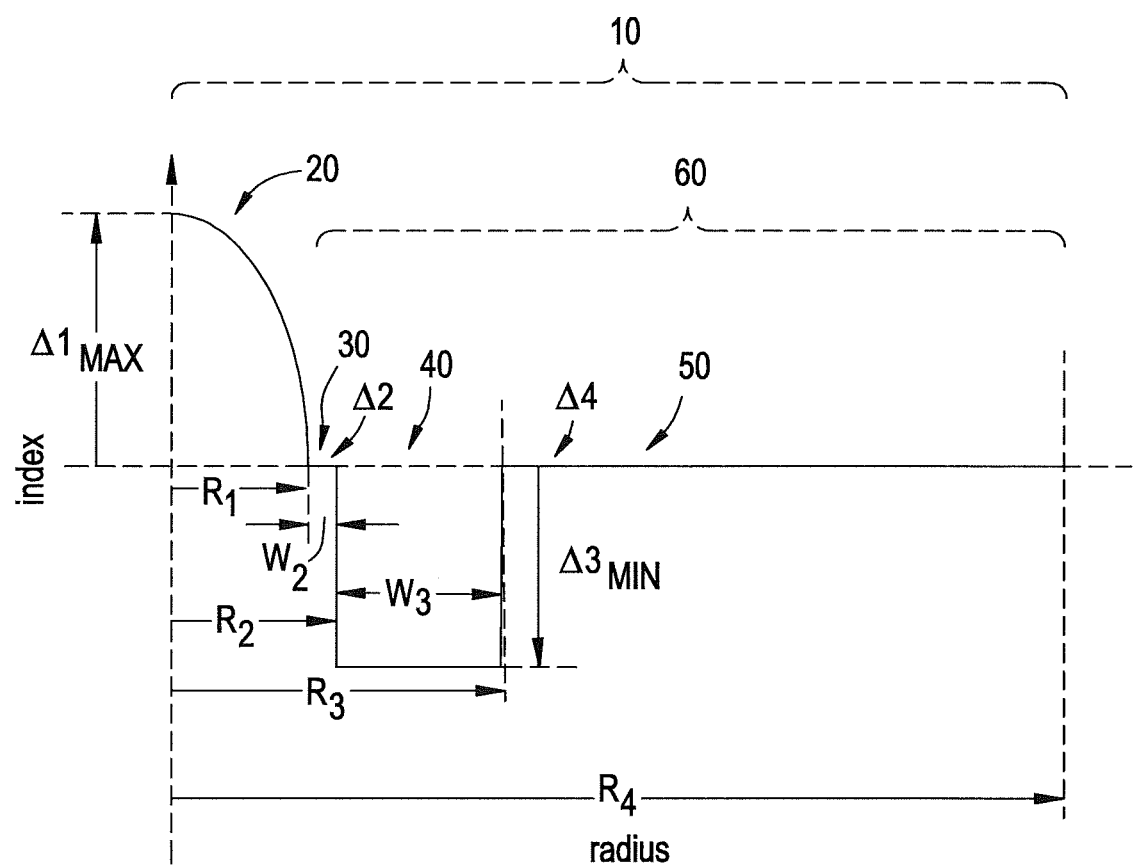
FIG. 1B is a schematic diagram (not to scale) of the relative refractive index profile of a cross section of the glass portion of an exemplary embodiment of a multimode optical fiber having a depressed-index annular portion, according to one embodiment.

Referring to FIG. 1B, a schematic representation of the refractive index profile of the cross section of the glass portion 10 of a multimode optical fiber 100 is shown according one embodiment. The glass portion 10 includes a graded index glass core 20 and a glass cladding 60 that surrounds the core 20 and is in contact with the core 20. The core 20 may include silica doped with germanium, according to one embodiment. According to other embodiments, dopants other than germanium, such as $Al_2O_3$ or $P_2O_5$ singly or in combination, may be employed within the core 20, and particularly at or near the centerline of the optical fiber 100. In this embodiment the cladding 60 includes an optional inner annular portion 30, an optional depressed-index annular portion 40, and an outer annular portion 50. In this embodiment the inner annular portion 30 surrounds and is in contact with the core 20. The depressed-index annular portion 40 surrounds and is in contact with the inner annular portion 30. The outer annular portion 50 surrounds and is in contact with the depressed-index annular portion 40. The cladding 60 may further include additional portions (not shown) such as further glass portions surrounding the outer annular portion 50. The fiber 100 may further include a protective coating(s) including urethane acrylate and acrylate primary and secondary coatings surrounding the cladding 60. As stated above, because cladding portions 30 and 40 are optional, in other embodiments the glass cladding 60 does not include an inner annular portion 30, and in some embodiments the glass cladding 60 also does not include depressed-index annular portion 40.

Figure 2:
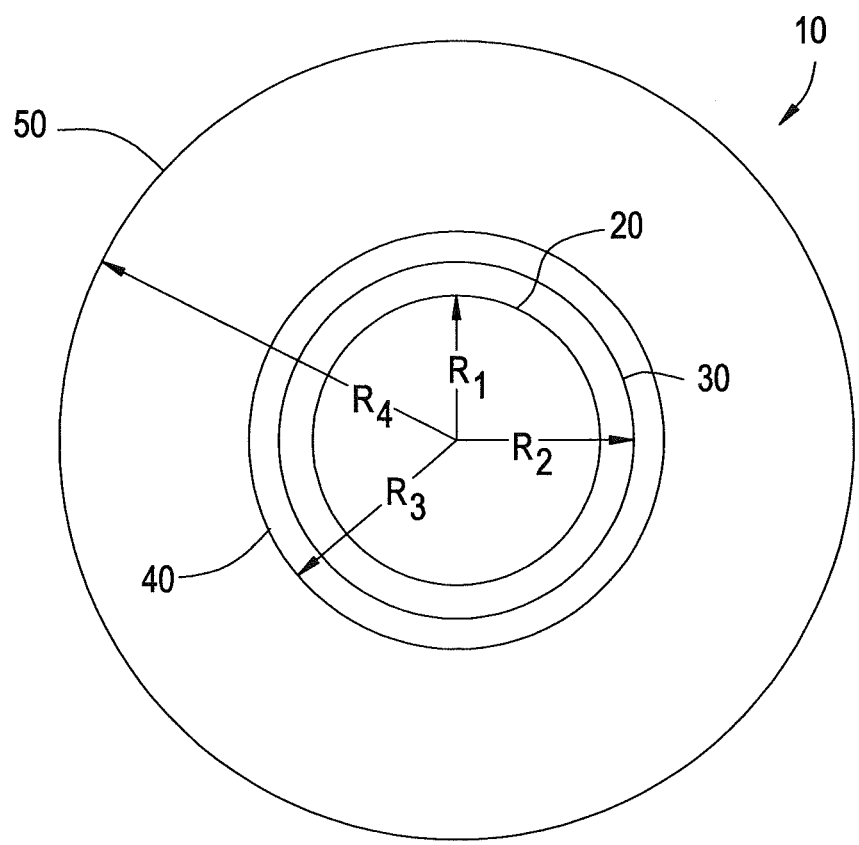
FIG. 2 is a cross-sectional view (not to scale) of the multimode optical fiber of FIG. 1B.

Referring to both FIGS. 1B and 2, the glass portion 10 of multimode optical fiber 100 is shown with the core 20 having an outer radius $R_1$. According some embodiments, the core outer radius $R_1$ is of $20 < R_1 < 45$ microns, which corresponds to a core diameter between 40 microns and 90 microns. For example, the core diameter may be 41, 42, 45, 48, 50, 55, 60, 62.5, 65, 70, 72, 75, 78 or 80 microns, or therebetween. In some embodiments the graded index core has an alpha ($\alpha$) value of not greater than 2.04, e.g., between 0.19 and 2.04. For example, in some embodiments $\alpha$ is 199, 2.0, 2.05, 2.07, 2.075, 2.08, 2.085, 2.09, 2.095, 2.097 or 2.1. In these embodiments the glass core 20 further has a maximum relative refractive index $\Delta_{1MAX}$ in the range of 0.9% to 3% (e.g., 0.9% to 2%), and in some embodiments is in the range of 0.7% to 1.2%.

Figure 3A:
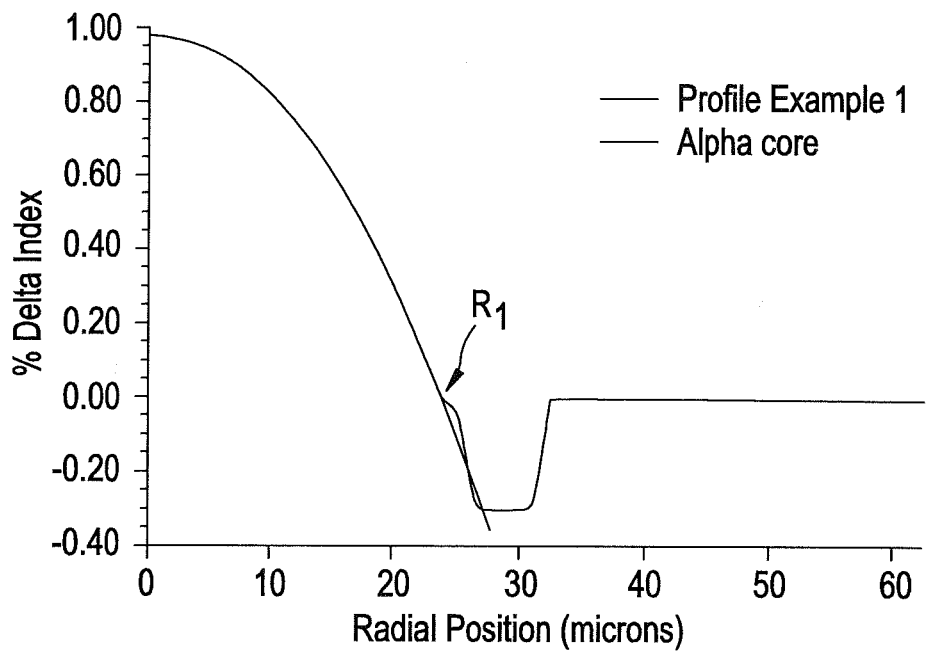
FIG. 3A is a graph illustrating the relative refractive index profile of an exemplary embodiment of the multimode optical fiber.
Figure 3B:
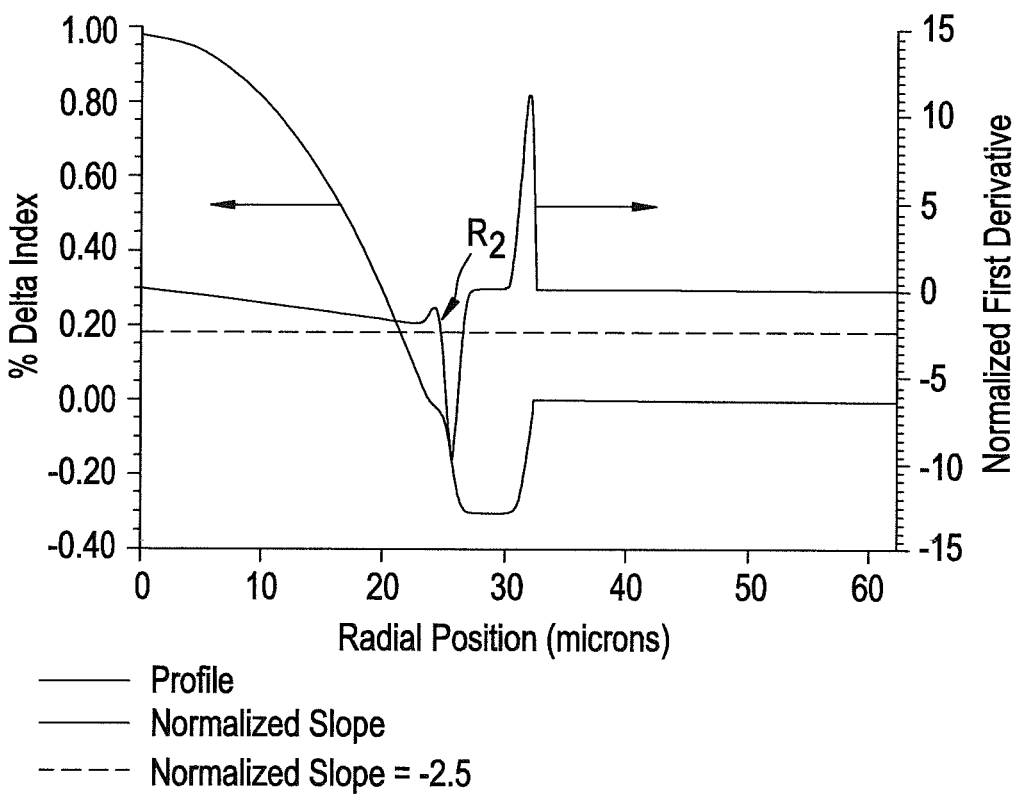
FIG. 3B is a graph illustrating the relative refractive index profile of another exemplary embodiment of the multimode optical fiber.

FIG. 3A illustrates a refractive index profile with the inner annular portion 30 of a fiber having an index profile as described above with respect to FIG. 1. The fiber corresponding to FIG. 3A comprises a graded index core and a cladding surrounding the core, wherein the cladding comprises an inner annular portion, a depressed annular portion surrounding the inner annular portion, and an outer annular portion surrounding the depressed annular portion. One example that has a fiber profile similar to that shown in FIG. 3A is a multimode fiber according to Example 1 fiber of Table 1. This fiber has core with an outer radius $R_1$ of 24.8 microns and the inner annular portion comprises a width of 0.86 microns. FIG. 3B illustrates a refractive index profile and a derivative of the normalized refractive index profile.

More specifically, as illustrated in FIGS. 3A and 3B, in some embodiments the fiber has an inner cladding portion 30. For these embodiments the inner cladding portion 30 of cladding 60 has an outer radius $R_2$, a width $W_2$, relative refractive index $\Delta_2$, and a maximum relative refractive index $\Delta_{2MAX}$. In the embodiments with an inner cladding portion 30, the outer radius of the inner cladding portion, $R_2$ is defined as the radius at which the derivative of the normalized refractive index profile (also known as the normalized slope and the normalized first derivative, herein) with respect to the normalized radius, $d(\Delta/\Delta_{1MAX})/d(r/R_1)$, is equal to $-2.5$, as shown in FIG. 3B. The refractive index $\Delta_2$ inner cladding portion 30 is the relative refractive index at the radius at which the first derivative $d(\Delta/\Delta_{1MAX})/d(r/R_1)$ is equal to $-2.5$, $\Delta_{1MAX}$ being the maximum core delta and $R_1$ being the core radius estimated by fitting the core index profile to an alpha profile, as described further below. The width $W_2$ of the inner cladding portion 30 may be, for example, in the range of 0.5 to 4.0 microns, and according to some embodiments preferably between 0.5 and 2.5 microns, for example 0.5 $\mu m \le W_2 \le 2.5$ $\mu m$. In some embodiments the outer radius $R_2$ of the inner cladding portion 30 is in the range of 23 to 40 microns. In some embodiments, the maximum relative refractive index $\Delta_{2MAX}$ of the inner cladding is less than about 0.1%. In other embodiments, the maximum relative refractive index $\Delta_{2MAX}$ of the inner cladding is less than about 0.0%. In other embodiments, the maximum relative refractive index $\Delta_{2MAX}$ of the inner cladding is between about $-0.1\%$ and about 0.1%.

If the fiber embodiment has a depressed index annular portion 40 the depressed-index annular portion 40 has a minimum relative refractive index $\Delta_{3MIN}$ and extends from $R_2$ to $R_3$, wherein $R_3$ is the radius at which $\Delta_3(r)$ first reaches a value of greater than $-0.05\%$, going radially outwardly from the radius at which $\Delta_3(r)=\Delta_{3MIN}$. The depressed-index annular portion 40 has a radial width $W_3=R_3-R_2$. In one embodiment, the depressed-index annular portion 40 has a width $W_3$ of at least 1 $\mu m$. $W_3$ is preferably between 2 $\mu m$ and 10 $\mu m$, more preferably between 2 $\mu m$ and 8 $\mu m$ and even more preferably between 2 $\mu m$ and 6 $\mu m$. The depressed-index annular portion 40 may have an outer radius $R_3$ in the range of 27 to 45 $\mu m$, more preferably 28 to 32 $\mu m$, for example 30 to 45 $\mu m$, or 35 to 45 $\mu m$. The depressed-index annular portion 40 has a minimum relative refractive index $\Delta_{3MIN}$ less than about $-0.2\%$, and more preferably the minimum relative refractive index $\Delta_{3MIN}$ may be in the range of $-0.3\%$ to $-0.7\%$. The low index ring has a minimum relative refractive index $\Delta_{3MIN}$ which is less than or equal to $\Delta_2$ and also less than $\Delta_{1MAX}$.

For optical fibers that have a depressed-index annular portion 40, the depressed-index annular portion has a profile volume, $V_3$, defined herein as:

$$V_3 = 2\int_{R_2}^{R_3} \Delta_3(r) r \, dr$$

where $R_2$ is the radius of the depressed-index annular portion as defined above, and $R_3$ is the outer radius of the depressed-index annular portion as defined above. For the fibers disclosed herein, the absolute magnitude of $V_3$ is preferably greater than 20%-$\mu m^2$, in some embodiments greater than 40%-$\mu m^2$, in other embodiments greater than 60%-$\mu m^2$, more preferably greater than 80%-$\mu m^2$, for example: greater than 90%-$\mu m^2$, greater than 95%-$\mu m^2$, greater than 100%-$\mu m^2$, or greater than 110%-$\mu m^2$. In some preferred embodiments, the absolute magnitude of $V_3$ is greater than 60%-$\mu m^2$ and less than 200%-$\mu m^2$. In other preferred embodiments, the absolute magnitude of $V_3$ is greater than 80%-$\mu m^2$ and less than 160%-$\mu m^2$. In other preferred embodiments, the absolute magnitude of $V_3$ is greater than 80%-$\mu m^2$ and less than 140%-$\mu m^2$. In other preferred embodiments, the absolute magnitude of $V_3$ is greater than 60%-$\mu m^2$ and less than 120%-$\mu m^2$.

In some embodiments, the cladding 60 includes a depressed-index annular portion 40 (also referred to as trench herein) which comprises silica doped with fluorine and/or boron. In some other embodiments that utilize a depressed-index annular portion 40, the depressed-index annular portion 40 comprises voids, either non-periodically disposed, or periodically disposed, or both. By "non-periodically disposed" or "non-periodic distribution", we mean that when one takes a cross section (such as a cross section perpendicular to the longitudinal axis) of the optical fiber, the non-periodically disposed voids are randomly or non-periodically distributed across a portion of the fiber. Similar cross sections taken at different points along the length of the fiber will reveal different cross-sectional hole patterns, i.e., various cross sections will have different hole patterns, wherein the distributions of voids and sizes of voids do not match. That is, the voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. The voids can contain one or more gases, such as argon, nitrogen, krypton, $CO_2$, $SO_2$, or oxygen, or the voids can contain a vacuum with substantially no gas; regardless of the presence or absence of any gas, the refractive index in the annular portion 50 is lowered due to the presence of the voids. While not wishing to be bound by theory, it is believed that the voids extend less than a few meters, and in many cases less than 1 meter along the length of the fiber. Optical fiber 100 disclosed herein can be made by methods which utilize preform consolidation conditions which are effective in trapping a significant amount of gases in the consolidated glass blank, thereby causing the formation of voids in the consolidated glass optical fiber preform. Rather than taking steps to remove these voids, the resultant preform is used to form an optical fiber with voids, or voids, therein. As used herein, the diameter of a hole is the longest line segment whose endpoints are disposed on the silica internal surface defining the hole when the optical fiber is viewed in perpendicular cross-section transverse to the longitudinal axis of the fiber.

Figure 3C:
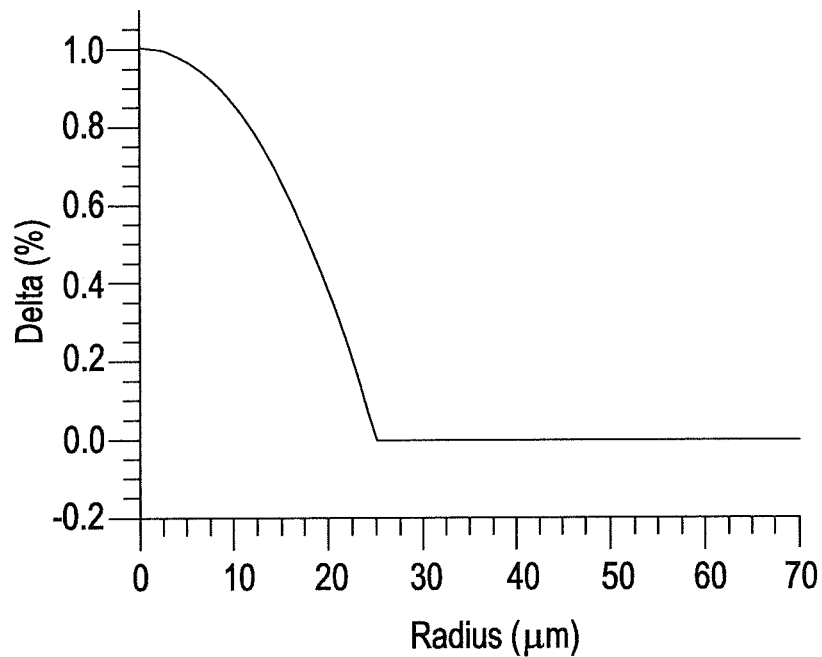
FIG. 3C is a graph illustrating the relative refractive index profile of another exemplary embodiment of the multimode optical fiber.

According to some embodiments, the outer annular portion 50 of cladding 60 has an outer radius $R_4$ and has relative refractive index $\Delta_4$ which is greater than $\Delta_2$ and greater than $\Delta_{3MIN}$ and less than $\Delta_{1MAX}$. In some embodiments, $\Delta_{1MAX} > \Delta_{44} > \Delta_2 > \Delta_{3MIN}$. However, it should be understood that other embodiments are possible. For example, $\Delta_4$ may be equal to $\Delta_2$. Alternatively, $\Delta_2$ may be greater than $\Delta_4$. According to one embodiment, the outer radius $R_4$ is about 62.5 microns, thereby resulting in an outer fiber diameter of about 125 microns. If the multimode optical fiber 100 according to some embodiments of the present invention does not include either the inner cladding portion 30, or the depressed-index annular portion 40, then the fiber 100 has a core 20 with the refractive index delta $\Delta_{1MAX}$ and a cladding 60 with relative refractive index delta $\Delta_4$, and $\Delta_{1MAX} > \Delta_4$. Such a fiber is illustrated, for example, in FIG. 3C.

The refractive index profile of a radially symmetric optical fiber depends on the radial coordinate r and is independent of the azimuthal coordinate φ. In most optical fibers, including the examples disclosed below, the refractive index profile exhibits only a small index contrast, and the fiber can be assumed to be only weakly guiding. If both of these conditions are satisfied, Maxwell's equations can be reduced to the scalar wave equation, the solutions of which are linearly polarized (LP) modes.

For a given wavelength, the radial equation of the scalar wave equation for a given refractive index profile has solutions which tend to zero for r going to infinity only for certain discrete values of the propagation constant β. These eigenvectors (transverse electric field) of the scalar wave equation are guided modes of the fiber, and the eigenvalues are the propagation constants $\beta_{lm}$, where l is the azimuthal index and m is the radial index. In a graded index fiber, the LP modes can be divided into groups, designated by common values of the principle mode number, p=l+2m−1. The modes in these groups have nearly degenerate propagation constants and cutoff wavelengths and tend to propagate through the fiber with the same group velocity.

The numerical aperture (NA) is defined as the sine of the maximum angle (relative to the axis of the fiber) of the incident light that becomes completely confined in the fiber by total internal reflection. It can be shown that this condition yields the relationship $NA = \sqrt{n_1^2 - n_{cl}^2}$, where $n_1$ is the maximum refractive index of the graded index core. Using the definition of delta (Δ), this expression can be transformed into the following equation:

$$NA = n_1 \sqrt{2\Delta} \qquad (10)$$
$$= n_{cl} \sqrt{\frac{2\Delta}{1 - 2\Delta}}$$

The overfilled bandwidth at a given wavelength is measured according to measurement standard FOTP-204 using an overfilled launch. The modeled bandwidth may be calculated according to the procedure outlined in T. A. Lenahan, "Calculation of Modes in an Optical Fiber Using the Finite Element Method and EISPACK," Bell Sys. Tech. J., vol. 62, pp. 2663-2695 (1983), the entire disclosure of which is hereby incorporated herein by reference. Modal delays are typically normalized per unit length and given in units of ns/km. The calculated bandwidths also assume that the refractive index profile is ideal, with no perturbations such as a centerline dip, and as a result, represent the maximum bandwidth for a given design.

According to the embodiments described herein, multimode fiber 100 has an overfilled bandwidth greater than 5000 MHz-km at the operating wavelength (e.g., 810 nm, 850 nm, 980 nm, 1060 nm, 1290 nm, 1310 nm, or at 1350 nm, or 1550 nm), and a numerical aperture NA less than 0.36 (e.g., 0.26 or less), preferably 0.16 to 0.36, more preferably 0.17 to 0.21. Preferably, the overfilled bandwidth is greater than 5000 MHz-km at the operating wavelength, and in some embodiments greater than 10000 MHz-km at the operating wavelength. In some fiber embodiments disclosed herein the overfilled bandwidth is greater than 10000 MHz-kin at 850 nm, and in some fiber embodiments have the overfilled bandwidth is greater than 20000 MHz-km at 850 nm, and in some fiber embodiments have the overfilled bandwidth is greater than 30000 MHz-km at 850 nm. In some embodiments, the overfilled bandwidth is greater than 2000 MHz-km at all wavelengths in the range from 850 nm to 1060 nm and in preferred embodiments, it is greater than 3000 MHz-km at all wavelengths in the range from about 850 nm to about 1060 nm.

EXAMPLES

Table 1, below presents three modeled fiber embodiments (fiber Examples 2, 3A and 3B) in which the multimode fiber 100 has a core diameter 50 microns and the core has a maximum relative refractive index $\Delta_{1MAX}$ of 1%. In these exemplary fiber embodiments, α=2.095. The overfilled bandwidth is greater than 7500 MHz-km (7.5 GHz-km) at 850 nm. The numerical apertures of these exemplary embodiments are all 0.205. The fiber dispersion is around −100 ps/nm/km at 850 nm, and the attenuation is around 2.3 dB/km at 850 nm.

In the following examples, we modeled several multimode optical fibers.

In the first set of examples, shown in Table 1, we chose to model multimode fibers with core delta of 1% and core radius of 25 µm, in order to have optimum performance around the 850 nm wavelength. The fiber embodiments corresponding to fiber Examples 2 and 3A are similar to the one illustrated in FIG. 3C—i.e., the cladding 60 does not include either the inner cladding portion 30, or the depressed-index annular portion 40. The fiber embodiment corresponding to fiber Example 3B fiber is similar to the one illustrated in FIGS. 1B and 2—i.e., the cladding 60 of this fiber embodiment includes the inner cladding portion 30 and the depressed-index annular portion 40. Table 1 also lists the parameters for a comparative fiber (Comparative Fiber 1).

TABLE 1

| Parameter | Comparative Fiber 1 | Example 2 | Example 3A | Example 3B |
|---|---|---|---|---|
| $\Delta_{1MAX}$ (%) | 1 | 1 | 1 | 1 |
| R1 (microns) | 25 | 25 | 25 | 25 |
| $\alpha$ | 2.095 | 2.095 | 2.095 | 2.095 |
| B[0]*1000 | 0 | 0.0 | −0.7 | −0.7 |
| B[1]*1000 | 0 | 0.7 | 0.6 | 0.6 |
| B[2]*1000 | 0 | 0 | 0 | 0 |
| B[3]*1000 | 0 | 0 | 0 | 0 |
| B[4]*1000 | 0 | 0 | 0 | 0 |
| R2 (microns) | 25 | 25 | 25 | 26.4 |
| $\Delta 2$ (%) | 0 | 0 | 0 | 0 |
| W2 (microns) | 0 | 0 | 0 | 1.4 |
| R3 (microns) | 25 | 25 | 25 | 31.9 |
| $\Delta_{3MIN}$ (%) | 0 | 0 | 0 | −0.5 |
| W3 (microns) | 0 | 0 | 0 | 5.5 |
| V3 (% microns$^2$) | 0 | 0 | 0 | 160 |
| R4 (microns) | 62.5 | 62.5 | 62.5 | 62.5 |
| $\Delta 4$ (%) | 0 | 0 | 0 | −0.5 |
| BW850 (GHz·km) | 14.38 | 13.2 | 36.7 | 20.6 |
| Core Diameter (microns) | 50 | 50 | 50 | 50 |

Figure 5:
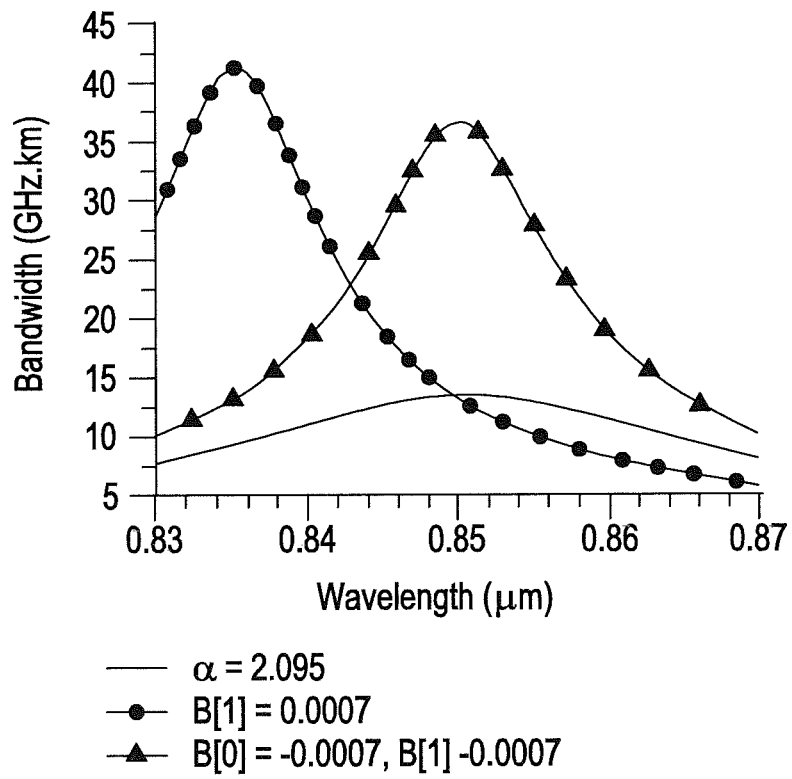
FIG. 5 illustrates the peak bandwidth (GHz·km) vs. wavelength for the comparative multimode fiber with a pure alpha profile; and for the two embodiments of the modeled multimode fiber that have the relative refractive index profile of the core defined by the alpha parameter α and by the non-alpha parameter B[1]

FIG. 5 illustrates the peak bandwidth (GHz·km) vs. wavelength for the comparative example fiber of Table 1 (Comparative Fiber 1) that has a refractive index profile defined only by the alpha parameter (i.e., a pure alpha profile); and for the two embodiments of the modeled multimode fiber 100 that have the relative refractive index profile of the core defined by both the alpha parameter $\alpha$ and by the non-alpha parameter B[1] (where B[1] is not zero).

Figure 4A:
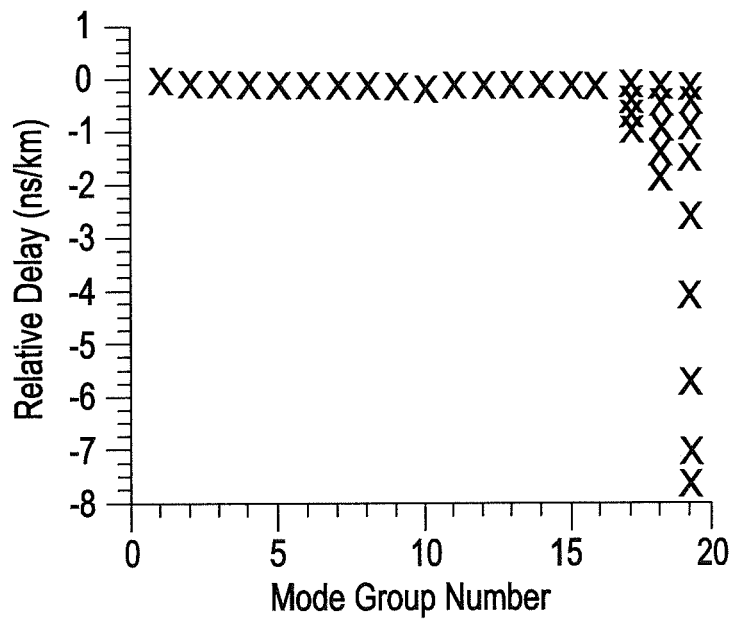
FIGS. 4A and 4B illustrate relative delays (ns/km) vs. mode group number at a 850 nm wavelength for a comparative multi-mode fiber with alpha of 2.095.
Figure 4B:
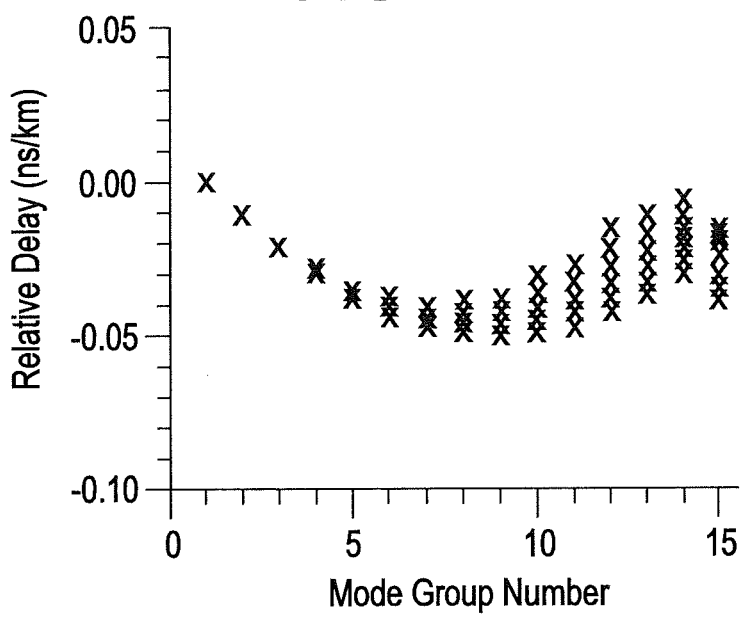

More specifically, we determined that for a comparative multimode fiber with pure alpha refractive index profile operating at 850 nm (i.e., no B[n] contribution), the optimum value for the alpha parameter is 2.095 (see Comparative Fiber 1 of Table 1). The mode group number cutoff for the fiber embodiments of Table 1 is 15, at 850 nm. The relative delay (ns/km) vs. mode group number for this comparative fiber is shown in FIGS. 4A and 4B. (Relative delay is the delay for a specific mode group relative to the delay of the mode group with the lowest mode group number.) At the operating wavelength of 850 nm, the first 15 mode groups contribute to the bandwidth, while the higher order modes (higher than group number 15) are lossy, and therefore are ignored. The maximum relative delay for this comparative fiber is around 0.04 ns/km. The calculated bandwidth of Comparative Fiber 1 is 14.38 GHz·km at 850 nm. The bandwidth dependence on the wavelength for Comparative Fiber 1 is shown in FIG. 5 (bottom curve).

We investigated the performance of the optical fiber embodiments 100 by adding a non-alpha profile feature to the modeled fiber with a pure alpha profile. For example, the embodiment of Example 2 fiber is similar to the Comparative Fiber 1, but has non-alpha parameter B[1]=0.0007 (all other B[n] parameter values were set to zero). We discovered that this fiber embodiment has a peak bandwidth which much larger than that of the Comparative Fiber 1. More specifically, the peak bandwidth of the modeled fiber with a non-alpha feature in the profile corresponding to the fiber with non-alpha contribution of B[1]=0.0007 has a peak bandwidth over 40 GHz·km at wavelength of 835 nm, and the bandwidth vs. wavelength curve is broader than the curve of the Comparative Fiber 1. However, as a result of introducing the non-alpha contribution to the core's refractive index profile, the peak wavelength (i.e., the wavelength corresponding to the of the peak bandwidth, also referred to as $\lambda p$ herein) had moved to a lower wavelength of 835 nm. This is also illustrated in FIG. 5 (see the curve with the high peak near the left side of this figure). To overcome this wavelength shift, we introduced a slight alpha correction through the parameter B[0], by specifying B[0]=−0.0007, which moved the peak wavelength bandwidth location back to 850 nm, as illustrated in FIG. 5 (high curve with the peak centered at 850 nm). This exemplary fiber is listed as fiber Example 3A in Table 1.

Figure 6A:
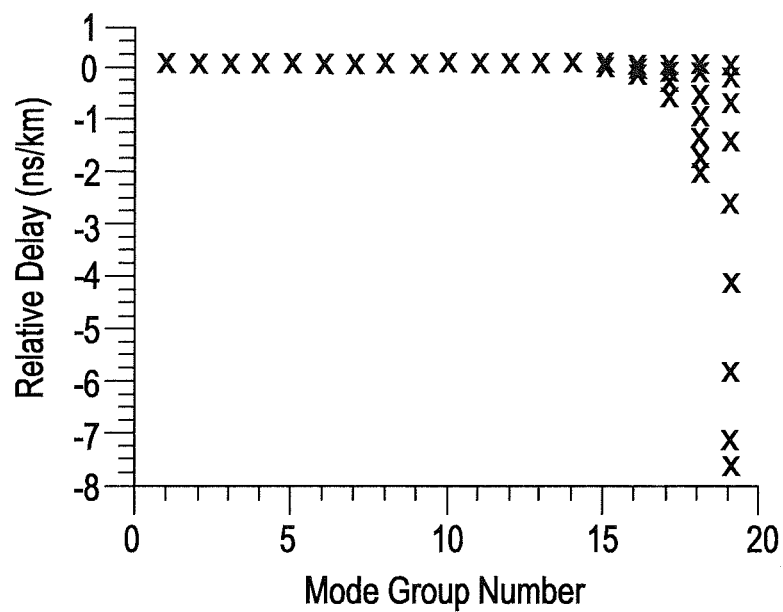
FIGS. 6A and 6B illustrate relative delay vs. the mode group number, peaked at 850 nm, for the multimode fiber with non-alpha terms.
Figure 6B:
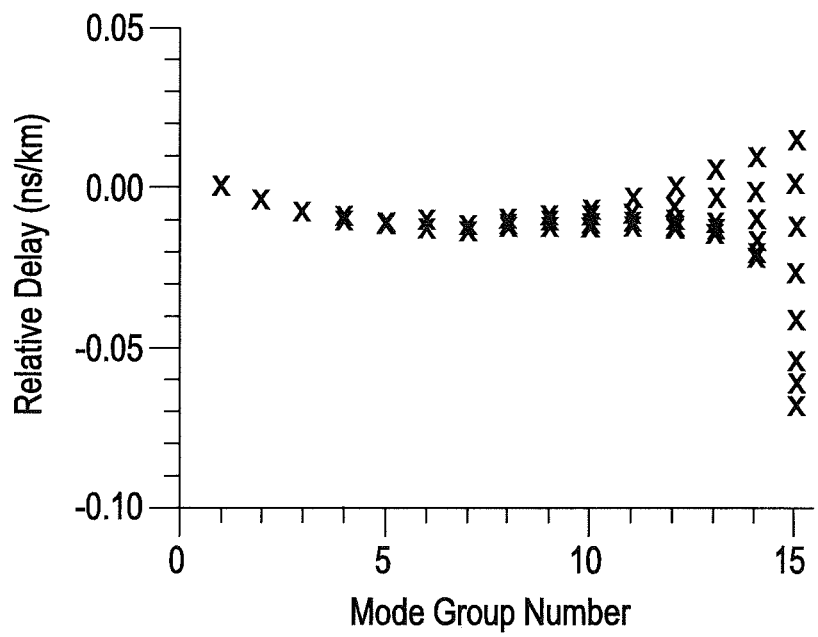
Figure 6C:
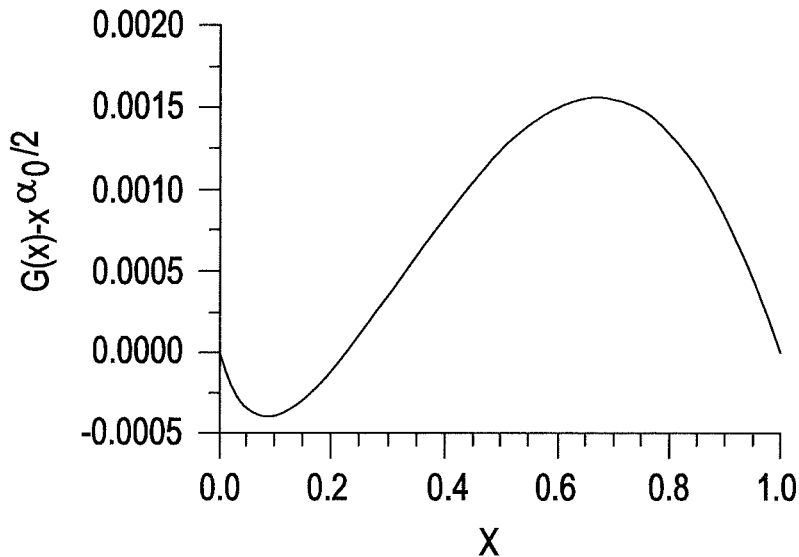
FIG. 6C shows a refractive index correction due to contributions from non alpha parameters, for the fiber core of the optical fiber embodiment that has the bandwidth curve shown in FIG. 5 (the bandwidth curve centered around 850 nm).

FIGS. 6A and 6B illustrate relative delay vs. the mode group number (at 850 nm) for the multimode optical fiber 100 that has a core profile defined by both alpha $\alpha$ and non-alpha terms B[n], where n is an integer equal to or greater than 1. FIG. 6B is an expanded portion of FIG. 6A. The normalized non-alpha contribution (H(x)) to the refractive index profile of the core for this fiber is shown in FIG. 6C. The horizontal axis corresponds to the normalized radius, so that X=r/R$_1$ (thus, X=1 at r=R$_1$). The peak bandwidth of this embodiment of the optical fiber 100 is 2.7 times better than that of Comparative Example 1 fiber. The deviation of the refractive index delta of the core (described by non-alpha parameter(s) B[n]) contributes to the higher bandwidth and broadened bandwidth vs. wavelength curve of this fiber.

More specifically, FIG. 6C illustrates the core's normalized refractive index correction H(x) (i.e., normalized deviation from the pure alpha profile) due to contributions from non alpha parameter(s) where (B[0]=−0.0007 and B[1]=0.0007, for the fiber that has its bandwidth centered at 850 nm in FIG. 5. (Note: $H(x)=G(x)-x^{\alpha_0/2}$)

It is noted that the non-alpha feature (i.e., deviation from the pure alpha profile) in the multimode fiber is measurable and detectable. An accurate refractive index measurement can identify whether or not the fiber core profile has a non-alpha contribution to its refractive index profile (e.g., whether or not at least one of the parameters B[1], B[2], B[3], B[4], B[5], etc. is non-zero).

As discussed above, the cladding 60 of multimode optical fiber 100 may include a depressed-index annular portion 40 (also referred as a trench herein), which makes it bending insensitive (see fiber Example 3B). The fiber's trench parameters are preferably chosen so as to avoid detrimental effect to the multimode fiber bandwidth. Otherwise, the relative delay for high mode group number can be much higher or much lower (i.e., by a factor of 3 or more) than those modes with the lower mode group numbers. We discovered that with the proper choice of trench parameters (i.e., the parameters that specify the location, width and minimum relative refractive index of the trench) the relative delay of the modes with high mode group numbers can be maintained to be close (within a factor or 2 or less) to the modes that have low mode group numbers. The existence of the trench also makes the higher order modes bending insensitive. It is found that when proper trench parameters are chosen, the multimode fiber 100 with a trench in the cladding can still achieve high bandwidth. For example, the fiber embodiment of Example 3B fiber (see Table 1) is similar to that of Example 3A fiber, because it has a core with the same $\Delta_{MAX1}$ and core radius $R_1$, and the same core alpha of 2.095. However, fiber Example 3B includes the inner cladding portion 30 and the depressed-index annular portion 40 (i.e., trench). This fiber is bend-insensitive and still has a much larger bandwidth (20.5 GHz/km) than that of Comparative Fiber 1.

As illustrated by the fiber embodiments disclosed in Table 1, a non-alpha contribution to the refractive index delta of the fiber core represented by at least one B[n] parameter (n≥1) with a non-zero value can significantly boost bandwidth performance of a multimode fiber (vs. that of a multimode fiber with pure alpha profile) by increasing the peak bandwidth value and broadening the bandwidth vs. wavelength curve. Preferably 1≥n≥10, more preferably 1≥n≥5. For example, B[n] may be non zero for some, or for all values of n, where 1≥n≥4, 1≥n≥3, 1≥n≥2, or n=1.

In another embodiment, the multimode optical fiber 100 has a core with a sinusoidal perturbation on top of an alpha profile (i.e., sinusoidal variation in fiber core's profile added to the core's profile determined by the core alpha). This fiber core profile can also be defined by the parameter(s) B[n]. More specifically, the sinusoidal perturbation (i.e., difference in refractive index delta (not percent delta) added to refractive index profile determined by alpha) is expressed as, $$\delta n = \delta n_0 \sin\left(\frac{2\pi}{\Lambda} r\right) \quad (11)$$

where $\delta n_0$ is varied over a range of between 0.00001 and 0.0001, and $\Lambda = R_1/N$ where $R_1$ is the core outer radius and N is parameter that determines the period $\Lambda$ of the sin function. Eq. (11) can be expanded by using the orthogonal function(s) $P_n(x)$ disclosed above so that:

$$\sin\left(\frac{2\pi}{\Lambda} r\right) = \sin\left(\frac{N\pi}{R_1} r\right) = \sum_{k=0}^{m} B[k] P_k(x) \quad (12)$$

The first 11 terms for each of these expansions are shown in the Table 2A below. The more terms that are used the better the fit of the sin functions to the $P_k$ functions. It is noted that m can be a number smaller than 11 and still be an adequate describe a sinusoidal perturbation of the core's alpha profile.

TABLE 2A

|       | k = 1     | k = 2     | k = 3     | k = 4     | k = 5     | k = 6     |
|-------|-----------|-----------|-----------|-----------|-----------|-----------|
| B[0]  | -0.693489 | 0.376487  | -0.069060 | 0.042308  | -0.016593 | 0.012033  |
| B[1]  | -0.129696 | -0.526399 | 0.526398  | -0.209838 | 0.127969  | -0.070069 |
| B[2]  | -0.036878 | -0.267599 | -0.268234 | 0.537945  | -0.326133 | 0.229727  |
| B[3]  | -0.020875 | -0.083550 | -0.341708 | 0.024113  | 0.408464  | -0.355196 |
| B[4]  | -0.014008 | -0.036227 | -0.153170 | -0.315916 | 0.273708  | 0.183665  |
| B[5]  | -0.010001 | -0.022883 | -0.060363 | -0.223999 | -0.188612 | 0.412490  |
| B[6]  | -0.007461 | -0.016446 | -0.031969 | -0.100356 | -0.261476 | 0.004865  |
| B[7]  | -0.005757 | -0.012426 | -0.021780 | -0.046484 | -0.151990 | -0.236184 |
| B[8]  | -0.004561 | -0.009703 | -0.016352 | -0.027894 | -0.071158 | -0.198947 |
| B[9]  | -0.003693 | -0.007771 | -0.012799 | -0.020062 | -0.037384 | -0.106952 |
| B[10] | -0.003043 | -0.006351 | -0.010291 | -0.015544 | -0.024467 | -0.053371 |
| B[11] | -0.002566 | -0.005322 | -0.008518 | -0.012575 | -0.018461 | -0.031227 |

In this optical fiber embodiment, Table 2B illustrates for the first six sin functions, and the preferred corresponding maximum values of m.

TABLE 2B

| n | m  |
|---|----|
| 1 | 4  |
| 2 | 8  |
| 3 | 7  |
| 4 | 8  |
| 5 | 11 |
| 6 | 6  |

Figure 7:
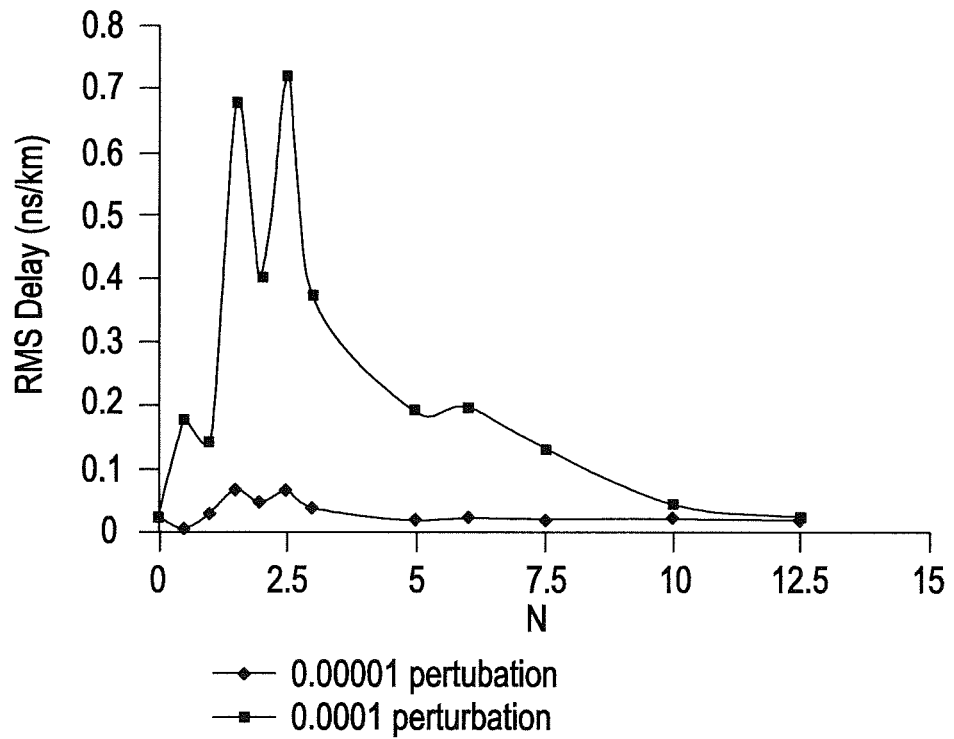
FIG. 7 illustrates RMS Delay for different values of N.

In order to determine what is the best period or value N of a sin function of a given amplitude, so as to produce a fiber core profile with largest peak bandwidth and the broadest bandwidth vs wavelength, we calculate or measure RMS delay by scanning through multiple N over a given range of N values (i.e., we modeled RMS delay for different N values in order to see which N value can provide a reduced RMS delay value). Note that the RMS delay is inversely proportional to the Bandwidth so that lower RMS delay is associated with the higher bandwidth. The results are shown in FIG. 7. More specifically FIG. 7 illustrates calculated RMS delay vs. for two exemplary fibers. In one of these fiber examples the amplitude of sinusoidal perturbation is 0.00001% (i.e., the maximum absolute value of the relative refractive index deviation from that determined by pure alpha profile is 0.00001%). In another example the amplitude of sinusoidal perturbation is 0.0001%. This figure illustrates that the sinusoidal perturbation with the amplitude of 0.00001% results in significantly lower RMS delay, and will have larger peak bandwidth value broadening bandwidth vs. wavelength curve than the optical fiber embodiment that has the sinusoidal perturbation with the amplitude of 0.0001%. In this example we found that when index perturbation level $\delta n_0$ is 0.00001, when N is equal to 0.5, the RMS (Root mean square) delay is reduced to a much lower level. We also realized that for the fiber with a sinusoidal index perturbation level of 0.0001, RMS delays increased relative to that of the fiber with a pure alpha profile, regardless of the N value. The results here are consistent with the previous embodiment in terms of the level of index perturbation and the rough shape of the refractive index profile from the pure alpha shape. That is, for this fiber, the index perturbation level of 0.0001 for the sinusoidal perturbation is too high, and smaller values of $\delta n_0$ are preferable.

Table 3 below provides parameters for two more embodiments of the multimode fiber 100 (fiber Examples 4 and 5). The multimode fiber 100 corresponding to these embodiments has a core diameter of 50 microns and the core has a maximum relative refractive index $\Delta_{1MAX}$ of 1. In these exemplary fiber embodiments, $2.07 \leq \alpha \leq 2.08$. The overfilled bandwidth is greater than 2300 MHz-km (2.3 GHz-km) at 850 nm, greater than 10 GHz-km at 980 nm, and greater than 3.5 GHz-km at 1060 nm. The magnitude of the dispersion is about −105 ps/nm/km at 850 nm, about −56 ps/nm/km at 980 nm, and about −34 ps/nm/km at 1060 nm, and the attenuation is about 2.3 dB/km at 850 nm.

More specifically, for fiber examples of Table 3, we modeled multimode fibers with 1% core delta and 25 micron core outer radius, but we also wanted to adjust the fiber profile to optimize the fiber performance so as to produce broadened bandwidth vs. wavelength. The detailed fiber parameters and properties are shown in Table 3 as fiber Examples 4 and 5. As illustrated by the Examples 4 and 5 fiber, the non-alpha contribution to the core delta can significantly boost bandwidth performance of a multimode fiber 100 (vs. that of the multimode fiber with pure alpha profile) broadening the bandwidth vs. wavelength curve.

TABLE 3

| Parameter | Example 4 | Example 5 |
|---|---|---|
| $\Delta_{1MAX}$ (%) | 1 | 1 |
| R1 (microns) | 25 | 25 |
| α | 2.074 | 2.07 |
| B[0]*1000 | −0.1833 | −0.269 |
| B[1]*1000 | 0.006 | 0.181 |
| B[2]*1000 | 0.0267 | 0.166 |
| B[3]*1000 | 0.0196 | 0.033 |
| B[4]*1000 | −0.0468 | −0.007 |
| R2 (microns) | 25 | 25 |
| Δ2 (%) | 0 | 0 |
| W2 (microns) | 0 | 0 |
| R3 (microns) | 25 | 25 |
| $\Delta_{3MIN}$ (%) | 0 | 0 |
| W3 (microns) | 0 | 0 |
| V3 (% microns$^2$) | | |
| R4 (microns) | 62.5 | 62.5 |
| Δ4 (%) | 0 | 0 |
| BW850 (GHz · km) | 2.3 | 2.5 |
| BW980 (GHz · km) | 14.9 | 10.2 |
| BW1060 (GHz-km) | 4.1 | 3.5 |
| Core Diameter (microns) | 50 | 50 |

The fiber embodiments in Examples 4 and 5 are similar to fiber Example 2, because in these fibers the cladding 60 does not include either the inner cladding portion 30, or the depressed-index annular portion 40. However, these exemplary fiber embodiments (fiber Examples 4 and 5) have non-alpha contributions that are described by parameters B[1], B[2], B[3] and B[4].

Figure 8:
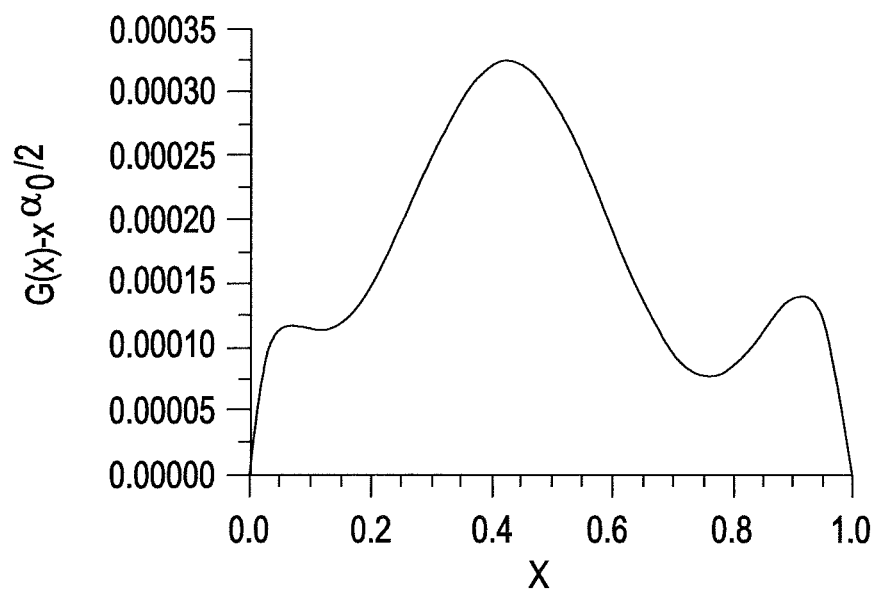
FIG. 8 is a plot of the higher-order contribution to refractive index from non-alpha parameter(s) for one exemplary embodiment of the multimode fiber vs. normalized radius X, where X=1 corresponds to radius $r=R_1$)

The fiber embodiment of Example 4 has a bandwidth of 2.3 GHz-km at 850 nm, which is an acceptable OM3 standard (>2 GHzkm at 850 nm) for the multimode fiber. At 980 nm and 1060 nm, this fiber embodiment has very good bandwidths of 14.9 GHz-km and 4.1 GHz-km respectively. These are better than the bandwidths of a multimode fiber with a pure alpha shape. For example, Comparative Fiber 1 has a bandwidth of 2.3 GHz-km at 980 nm and a bandwidth of 1.7 GHz-km at 1060 nm. The higher order normalized contribution (i.e., the normalized non-alpha contribution) for the Example 4 fiber defined by H(x) (see Eq. (9)) vs. normalized core radius is shown in FIG. 8. (Note: $H(x)=G(x)-x^{\alpha_0/2}$)

Figure 9:
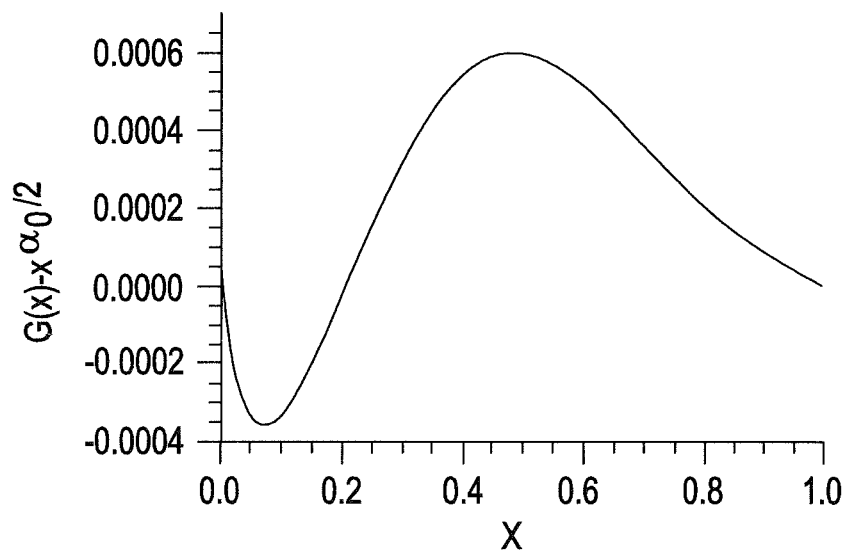
FIG. 9 is a plot of the contribution to refractive index delta from non-alpha parameter(s) vs normalized core radius X for another exemplary embodiment of the multimode fiber.

In Example 5 fiber, we show that the bandwidth at 850 nm can be improved while slight penalty is taken at 980 nm and 1060 nm bandwidth. The plot of normalized non-alpha contribution $H(x)=G(x)-x^{\alpha_0/2}$ (i.e., the refractive index contribution to this fiber's core due to parameters B[n]) vs. the normalized radius is shown in FIG. 9. In the calculations, we have taken into account that there are fewer mode groups at higher wavelengths so we changed the modal cutoff according to wavelength. As mentioned above, for Example 5 fiber embodiment, the modal cutoff at 850 nm is 15 (i.e., the highest optical mode group# is 15) and we choose the modal cutoff to be 12 at 980 nm. The multimode fibers 100 of Examples 4 and 5 can be used for operating at multiple wavelengths. The optical fibers 100 corresponding to Examples 4 and 5 are of good quality and meet OM3 standard at 850 nm. However, in addition, these optical fibers 100 have very high bandwidth at both 980 nm and 1060 nm. Thus, one such fiber can accommodate several wavelengths of interest. Accordingly, we consider these fibers to be "backward compatible". Note that the existing OM3 standard focuses primarily on 850 nm, i.e., it specifies the peak bandwidth at 850 nm, but also specifies minimum acceptable bandwidth at 1310 nm to accommodate the applications at 1310 nm. The Example 4 and 5 fibers are suitable for use at 850 nm or around 980 nm. They are also suitable for use in 980 nm and 1060 nm, which is attractive for customers because they don't need to purchase different fibers for operating at different wavelengths.

Figure 10:
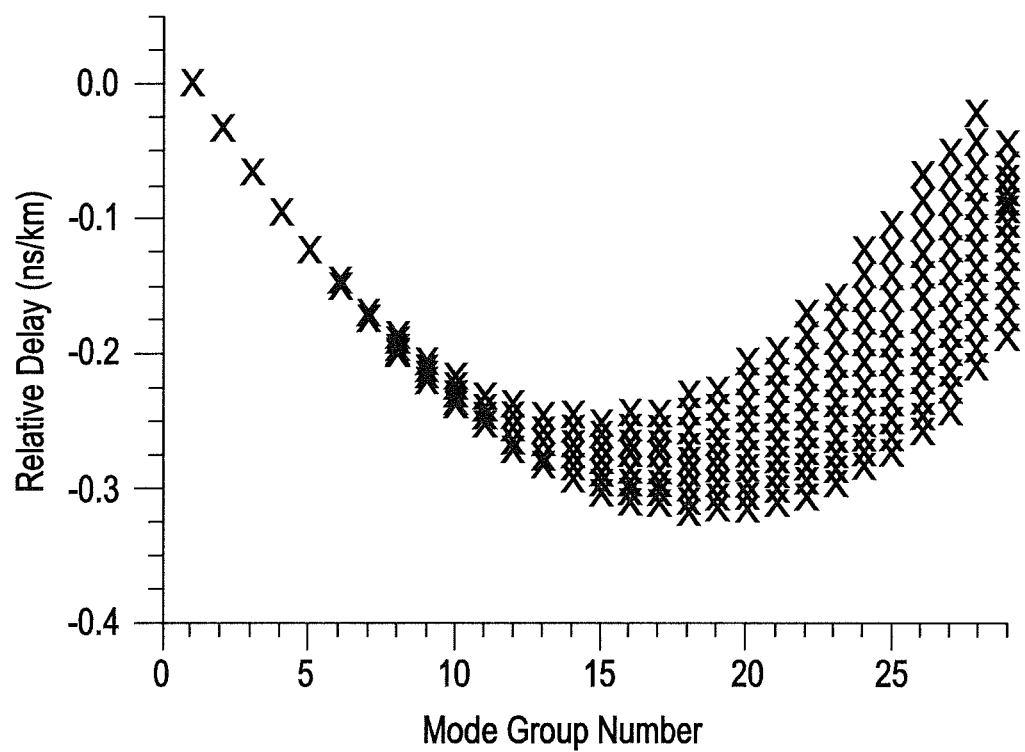
FIG. 10 illustrate relative delay vs. mode group number for a pure alpha profile fiber with alpha value of 2.08.
Figure 11A:
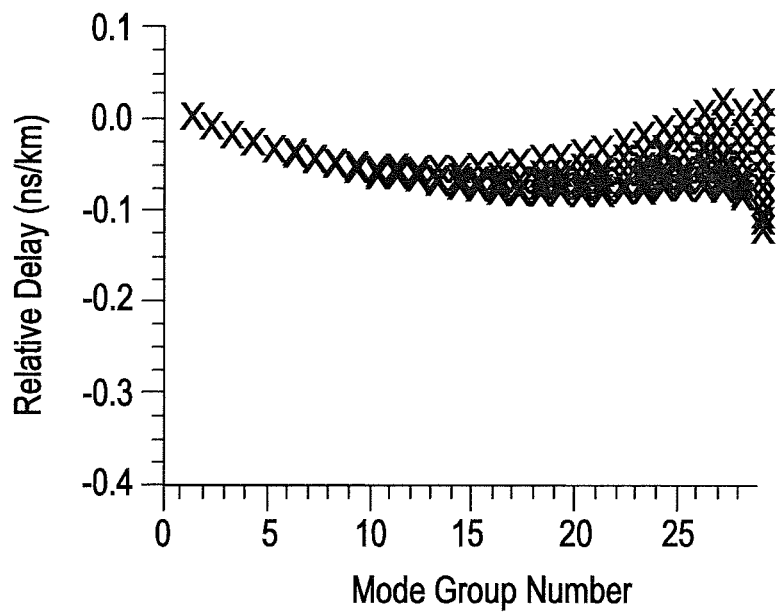
FIGS. 11A and 11B illustrates the relative delay vs. mode group number for an exemplary fiber with the modified core profile that has non-alpha parameter correction to the core's refractive index.
Figure 11B:
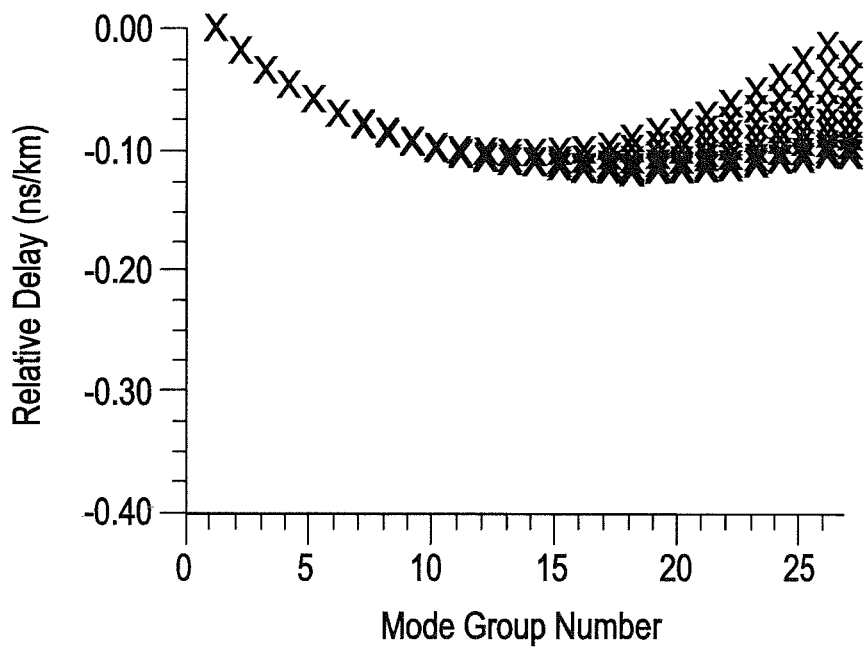

In the next examples, we consider multimode optical fibers 100 that have high core delta values and larger core sizes. These optical fibers embodiments are suitable for consumer applications and for data center applications. First, we consider multimode fibers 100 with 2% core delta and 62.5 micron core diameter. Comparative Fiber 2 has a core with a pure alpha profile and an alpha value of 2.083) and achieves an overfill bandwidth of 3.0 GHz-km (with the highest optical mode number included in calculation being 27). The relative delay versus mode group number for this comparative fiber is shown in FIG. 10. As shown in FIG. 10, if a fiber has a pure alpha core profile, even when alpha parameter α has an optimal value, the relative delay plot is curved, i.e., it has a strong drop or dip in the center of the plot, which is due to intrinsic material dispersion of the fiber. This is one of the reasons why those of ordinary skill in the art believe that the higher core delta leads to lower multimode fiber bandwidth. With the use of the additional, non-alpha contribution to the core's relative refractive index profile (i.e., when the fiber core profile has non-alpha feature(s) described by the non-alpha parameter B[n]) as shown for example, in Example 6 fiber, we can use a fiber with the same core delta and compensate for the intrinsic material dispersion of the fiber, so that the relative delay plot is largely flattened out. As shown in FIGS. 11A and 11B, by choosing a core with a refractive index profile defined by B[0]=−0.00053; B[1]=0.001; B[3]=0.00003 and the alpha of 2.083, we are able to obtain a much flatter relative delay vs mode group number plot. The bandwidth for this multimode fiber 100 embodiment (Example 6 fiber) is 6.35 GHz-km, which is a factor of 2.12 improvement over a similar comparative multimode fiber (Comparative Fiber 2) that has a pure alpha profile.

Figure 12:
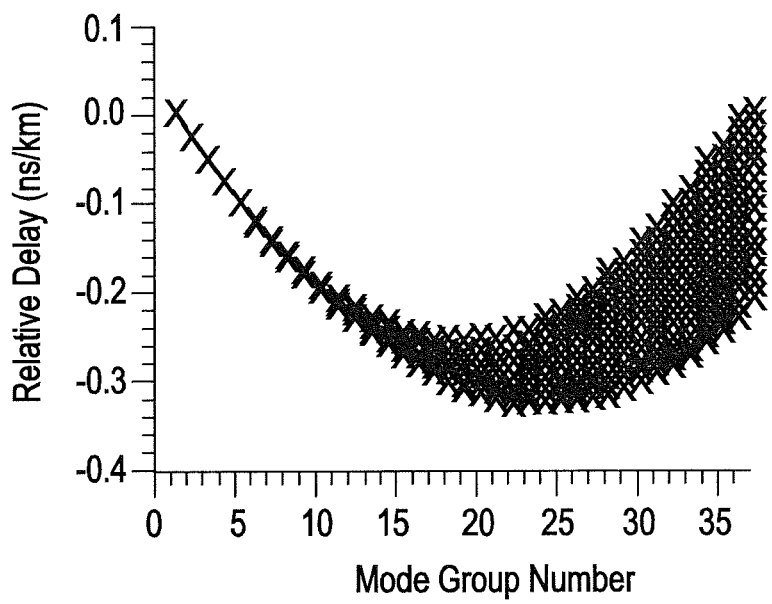
FIG. 12—illustrates the relative delay vs. mode group number for a pure alpha profile fiber with alpha value of 2.08, and core radius of 40 microns.
Figure 13:
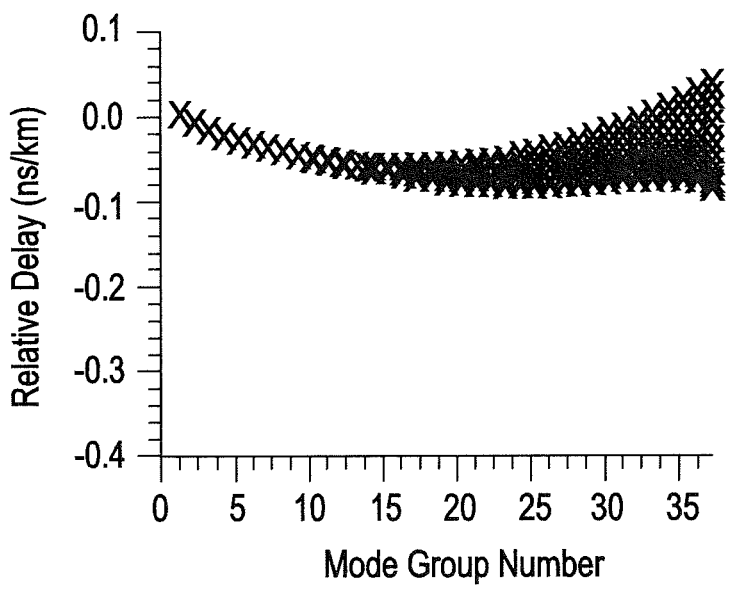
FIG. 13—illustrates the relative delay vs. mode group number for an exemplary fiber embodiment.

A multimode fiber (Comparative fiber 3) that has a core delta of 2.0% and a core radius of 40 μm, and a pure alpha profile with the alpha value α=2.083, can achieve a bandwidth of 2.62 GHz·km (37 mode groups have been included in calculating the bandwidth of this fiber). The delay versus mode group number for this fiber is shown in FIG. 12. Again, we found that even with optimal alpha, there is a substantial curvature in the relative delay plot, which is due to intrinsic material dispersion. That is, the plot of Relative delay (ns/km) vs. mode group number is not straight, but exhibits a strong minimum for the mode groups 10-25, with a minimum at −0.28 ns/km for mode groups 15-20. With the use of the non-alpha feature (see Example 7 fiber), we provide a correction to the pure alpha core profile so that the relative delay plot is largely flattened out. The optical fiber 100 corresponding to the Example 7 fiber has the following core parameters: alpha (core)=2.083; B[0]=−0.00053; B[1]=0.001; B[3]=0.00003, and has much flatter relative delay plot than that of Comparative Fiber 3. The plot of the relative delay vs. mode group number for Example 7 fiber is shown in FIG. 13. The largest minimum delay for Example 7 fiber is about −0.12 ns/km, which is more than a factor of 2 better than that of the Comparative Fiber 3. The overfill bandwidth for this fiber is 5.35 GHz·km, a factor of 2 improvement over the Comparative fiber 3 that has a pure alpha profile. A bending insensitive version of this fiber embodiment is Example 8 fiber of Table 4. More specifically, in this fiber, a Fluorine doped trench can be situated within the cladding 60, to provide a bending insensitive multimode fiber 100. The location, width and depth of the trench 40 can affect the fiber bandwidth. For example, in order to maximize the fiber's bandwidth, an optical fiber 100 similar to that of Example 7 but with a cladding that has trench has the following trench parameters: the trench depth is −0.5%, trench width is 5.5 microns, the starting radius (i.e., internal radius) of 41.3 microns.

TABLE 4

| Parameter | Comparative fiber 2 | Example 6 | Comparative fiber 3 | Example 7 | Example 8 |
|---|---|---|---|---|---|
| $\Delta_{1MAX}$ (%) | 2 | 2 | 2 | 2 | 2 |
| R1 (microns) | 31.25 | 31.25 | 40 | 40 | 40 |
| α | 2.083 | 2.083 | 2.079 | 2.079 | 2.079 |
| B[0]*1000 | 0 | −0.53 | 0 | −0.3 | −0.3 |
| B[1]*1000 | 0 | 1.0 | 0 | 1.0 | 1.0 |
| B[2]*1000 | 0 | 0.03 | 0 | 0.03 | 0.03 |
| B[3]*1000 | 0 | 0 | 0 | 0 | 0 |
| B[4]*1000 | 0 | 0 | 0 | 0 | 0 |
| R2 (microns) | 31.25 | 31.25 | 40 | 40 | 41.3 |
| $\Delta 2$ (%) | 0 | 0 | 0 | 0 | −0.5 |
| W2 (microns) | 0 | 0 | 0 | 0 | 1.3 |
| R3 (microns) | 31.25 | 31.25 | 40 | 40 | 46.8 |
| $\Delta_{3MIN}$ (%) | 0 | 0 | 0 | 0 | −0.5 |
| W3 (microns) | 0 | 0 | 0 | 0 | 5.5 |
| V3 (% microns$^2$) | 0 | 0 | 0 | 0 | 242.3 |
| R4 (microns) | 62.5 | 62.5 | 62.5 | 62.5 | 62.5 |
| $\Delta 4$ (%) | 0 | 0 | 0 | 0 | 0 |
| BW850 (GHz·km) | 3.0 | 6.35 | 2.62 | 5.35 | 4.85 |
| Core Diameter (microns) | 62.5 | 62.5 | 80 | 80 | 80 |

Comparative Fiber 4 (see Table 5) is a multimode fiber with pure alpha profile optimized for providing maximum bandwidth at 1310 nm wavelength. The core delta of this fiber is 2% with the outer radius $R_1$ of 31.25 microns. The overfill bandwidth of this comparative fiber is 4.57 GHz·km at 1310 nm, with the bandwidth contributed to by about 17 mode groups. With addition of non-alpha contribution (characterized by B[1]) to the fiber core's relative refractive index profile, the multimode fiber 100 (Example 9 fiber listed in Table 5) has the bandwidth of 7.63 GHz·km. That is, the bandwidth of Example 9 fiber is 67% higher than the bandwidth of the Comparative Fiber 4.

TABLE 5

| Parameter | Comparative fiber 4 | Example 9 |
|---|---|---|
| $\Delta_{1MAX}$ (%) | 2 | 2 |
| R1 (microns) | 31.25 | 31.25 |
| α | 1.987 | 1.987 |
| B[0]*1000 | 0 | −1.2 |
| B[1]*1000 | 0 | 1.02 |
| B[2]*1000 | 0 | 0 |
| B[3]*1000 | 0 | 0 |
| B[4]*1000 | 0 | 0 |
| R2 (microns) | 31.25 | 31.25 |
| $\Delta 2$ (%) | 0 | 0 |
| W2 (microns) | 0 | 0 |
| R3 (microns) | 31.25 | 31.25 |
| $\Delta_{3MIN}$ (%) | 0 | 0 |
| W3 (microns) | 0 | 0 |
| V3 (% microns$^2$) | 0 | 0 |
| R4 (microns) | 62.5 | 62.5 |
| $\Delta 4$ (%) | 0 | 0 |
| BW1310 (GHz·km) | 4.57 | 7.63 |
| Core Diameter (microns) | 62.5 | 62.5 |

Figure 14:
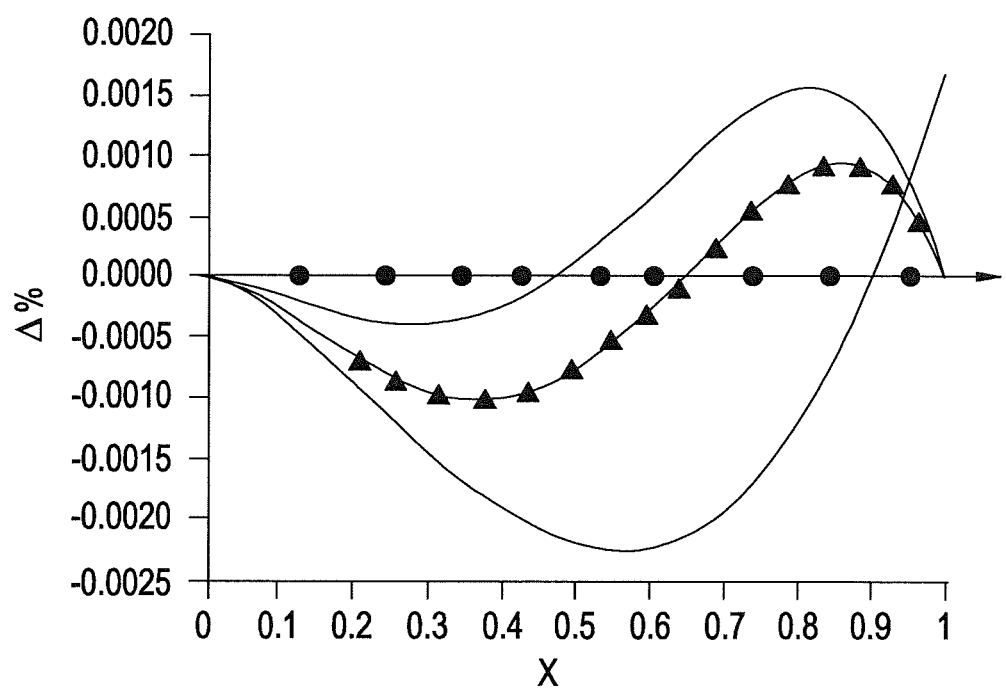
FIG. 14 illustrates the relative refractive index delta correction (including contribution from non-alpha parameter(s)) B[n] to the core profile for two exemplary fiber embodiments, and from comparative fiber.

A publication by J. S. Cook (*Bell Tech J.*, 56, p 719-738, 1977) describes a fiber that has a non-alpha profile. The refractive index of profile in terms of refractive index of this fiber is shown in FIG. 14 and is characterized by a curve that crosses the horizontal axis ($X=r/R_1$) only 2 times, i.e., when X=0 and when X=0.9. More specifically, FIG. 14 illustrates for this fiber's core the non-alpha contribution applied on top of an alpha profile, in terms of Δ (%). As we can see, for this fiber, the plot has a minimum value of 0.00225% at X=0.55 and the maximum value of about more than 0.0016% at X=1 (i.e., at $r=R_1$). (It is noted that the non-alpha correction of fiber Comparative Fiber 1 was plotted, it would be zero across the fiber core, because for Comparative Fiber 1 the parameters B[n]=0 for all values of n≥1, this is illustrated in FIG. 14 horizontal line with circles.)

FIG. 14 also depicts the relative refractive index correction (in terms of Δ, %) for core profiles of two exemplary optical fiber embodiments 100 (i.e., for Example 2 fiber and Example 3A fiber). By comparing the core refractive index profiles of these two optical fiber embodiments (Example 2 and Example 3A of Table 1) with that of the fiber core disclosed by J. S. Cook, we see that at the radius $r=R_1$ the two fiber embodiments 100 have no significant refractive index departures from that determined by the core alpha at the radius $r=R_1$. That is, in Example 3 embodiment the difference in the refractive index delta of the fiber core from that determined only by the core alpha value, at the radius $R_1$ is less than 0.001%), and more specifically in these two embodiments there no index changes relative to that defined by the core alpha value at the core boundary (at X=r/a=1, or at r=$R_1$). In contrast, the non-alpha deviation in the fiber core disclosed by the J. S. Cook, at the edge of the core (r=$R_1$) has a positive value that is greater than 0.0015%.

Figure 15:
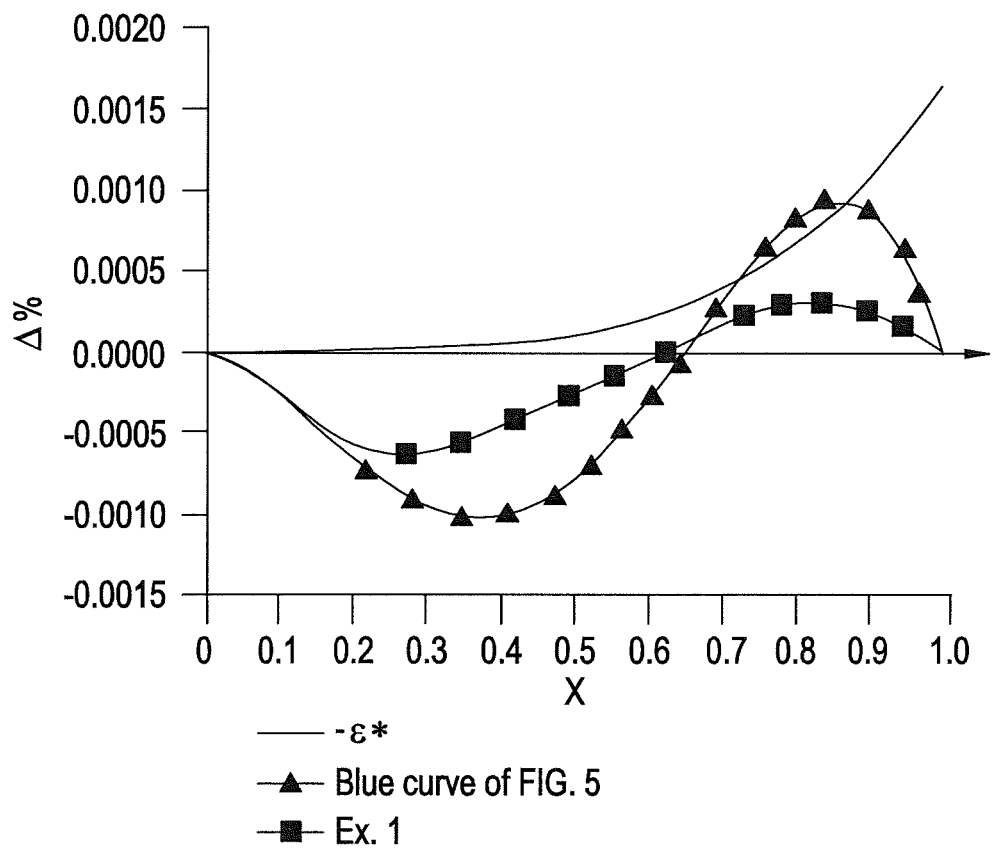
FIG. 15 illustrates the relative refractive index delta contribution from the non-alpha parameter(s) to the core profile for the two exemplary fiber embodiments, and from the comparative fiber.

Furthermore, FIG. 14 illustrates that the index correction curves, (in term of relative refractive index delta Δ (%)) for two optical fiber embodiments 100 described herein cross the horizontal axis at least once when the ratio x=r/$R_1$ is between 0.2 and 0.8. This is not the case for the fiber disclosed by J. S. Cook. Finally, FIG. 14 indicates that for some embodiments of the optical fiber 100 these curves cross the horizontal axis at least twice when r>0. For example, the curves of FIG. 14 corresponding to the two optical fiber embodiments 100 reach their maximum negative value, cross the horizontal axis, then reach their maximum positive value, and then decrease in value, prior to reaching the value zero when the radius r is 0.8≤r≤$R_1$. For example, in FIG. 14 the index correction curves corresponding to the two optical fibers embodiments have negative delta values when core radius is 0<r<0.45 and positive values for 0.7<r<0.9. More specifically, in these two embodiments the value of relative refractive index delta is zero at r=$R_1$. It is noted that for other embodiments the curves may reach their maximum positive value before they cross the horizontal axis, and then reach their maximum negative value, and then become more positive (or less negative), prior to reaching the radius r=$R_1$. We also discovered that optimization of bandwidth is preferably made in two stages: First, the refractive index profile of the core is modified to increase the bandwidth. This optimization can result in the increase of the peak bandwidth not being at the original and the desired wavelength. Then, the alpha value for the core can be adjusted to a new "alpha value", either directly or by allowing the B[0] constant to be non-zero. As noted above, the value of B[0] can be "combined" with the original alpha value to obtain a new alpha value, by effectively forcing the value of B[0] to be zero and by assigning a new alpha value. FIG. 15 is similar to FIG. 14 but illustrates refractive index corrections due to B[n] parameters only, i.e., with the alpha portion of the core removed. That is, FIG. 15 illustrates index correction purely due to the non-alpha contribution(s) (i.e., that due to parameters B[n], where n≥1). Again, we observe that the non-alpha contribution of the index profile of the cores in the two fiber embodiments 100 described herein have zero values when: (i) x=0; and (ii) 0.8<x=r/$R_1$<1, and/or 0.5<x<0.8, where x=r/$R_1$.

FIG. 15 illustrates one embodiment of the optical transmission system that utilizes multimode fiber 100. According to some embodiments the multi-mode optical fiber 100 is coupled to at least one light source 204 operating between 800 and 1600 nm (for example between 830 nm and 1350 nm or between 850 nm and 1060 nm) and modulated at a bit rate greater than 20 Gb/s (e.g., 25 Gb/s). Fiber 100 is a multimode optical fiber optically and comprises a graded index a graded index glass core of 40 to 100 μm in diameter, and a cladding comprising an outer cladding portion. A receiver or photodetector 210 is optically coupled to the multimode optical fiber 100 and is structured to be capable of detecting a wavelength in a wavelength range greater than 800 nm, for example 800 nm to 1600 nm.

Figure 16:
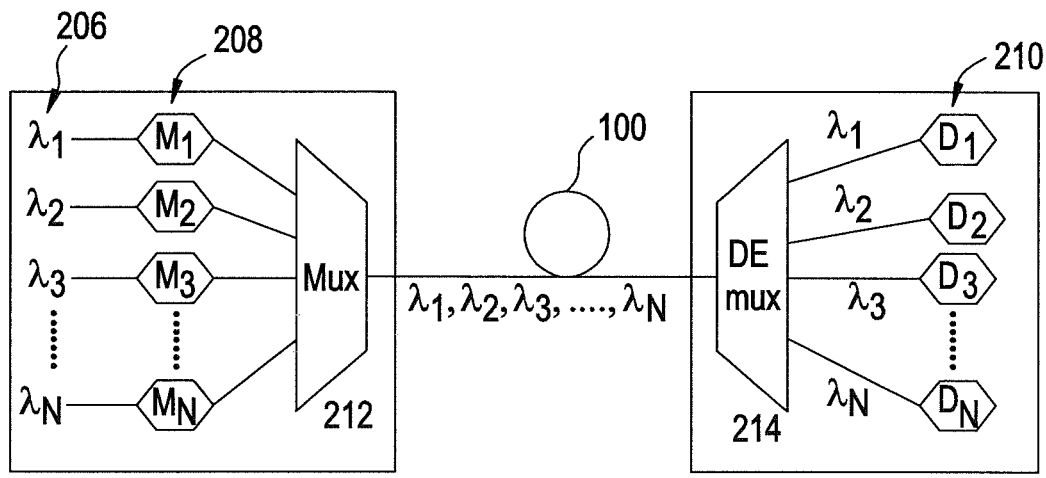
FIG. 16 is a schematic illustration of a transmission system utilizing one embodiment of the multimode optical fiber.

According to some embodiments the optical fiber 100 is coupled to a VCSEL, and the VCSEL is modulated at a rate greater than 20 GHz. Thus, exemplary fibers 1-28 of Tables 1 through 4 are suitable for use in an optical transmission system. According to one embodiment, the system 200 comprises: (i) a transceiver comprising at least one light source 206, wherein the light source is modulated at a bit rate of 25 GHz or higher (and preferably, according to some embodiments, at 40 GHz or higher) at one or more wavelengths between 800 and 1600 nm (e.g., between 800 and 1400 nm, or between 800 and 1100 nm, or between 950 and 1100 nm, etc.); (ii) at least one multimode optical fiber 100; and (iii) a receiver comprising at least one photodetector 210. In one embodiment, the transceiver comprises N light sources modulated at a bit rate of 25 GHz or higher (see, for example, FIG. 16). The transceiver may also comprise at least one external modulator 208 which modulates at least one light source at a bit rate of 25 GHz or higher. The transceiver may further comprise a multiplexer (Mux) 212 which multiplexes the N wavelengths from N light sources into a single waveguide. The receiver may further comprise a demultiplexer (Demux) 212 which demultiplexes the optical signal into N wavelengths and optically couples them to N photodetectors 210. The photodetector 210 is optically coupled to the multimode optical fiber 100 and capable of detecting a wavelength in the 1200 to 1400 nm wavelength range.

In some embodiments, for example, the light source 206 (e.g., VCSEL or silicon-photonics laser) is modulated at a bit rate of at least 10 GHz, in some embodiments at least 16 GHz or 20 GHz, in some embodiments at least 25 GHz. Some embodiments of fiber have an overfilled bandwidth greater than 4.7 GHz-km at one or more wavelengths between 800 nm and 1600 nm, (for example at 850 nm, and/or 1060 nm). It is noted that light sources other than VCSELS may also be utilized, for example, hybrid silicon lasers (e.g. silicon-photonic lasers) operating at wavelengths between 1200 and 1400 nm, or 1260 nm and 1400 (e.g., between 1260 and 1360 nm). Hybrid silicon lasers are made, for example, by bonding an Indium Phosphide based wafer directly to a pre-patterned silicon photonic chip. When a voltage is applied to the bonded chip, the light generated from the Indium Phosphide based material couples directly into the silicon waveguide, creating a hybrid silicon laser 206. One of the main advantages of this technology is the ability to incorporate many lasers onto a single chip, and the outputs from these lasers can be multiplexed into a single output that is then coupled to a multimode fiber 100. For example, two, four, eight or sixteen wavelengths may be modulated at a bit rate of 25 GHz or higher, multiplexed into a single output channel, and then optically coupled to the input end of multimode fiber 100. The output end of multimode fiber 100 is optically coupled to a receiver which demultiplexer the two, four, eight or sixteen wavelengths and optically couples them to photodetectors capable of detecting the optical signals.

One embodiment of such system comprises, for example: (i) at least one VCSEL 206, the VCSEL transmitting at a bit rate of 25 GHz or higher (and preferably, according to some embodiments) at 40 GHz or higher at one or more wavelengths between 1260 and 1360 nm; (ii) a multimode optical fiber 100; and (iii) at least one photodetector 210. The multimode fiber 100 for example, comprises a graded index glass core 20; an inner cladding portion 30 surrounding and in contact with the core, and a depressed-index annular cladding portion 40 surrounding the inner cladding portion. 30, the depressed-index annular portion 40 having a relative refractive index delta less than about −0.2% and a width of at least 1 micron, wherein the core 20 has a radius greater than 20.5 microns and less than 40 microns, a maximum relative refractive index between 0.6% and 1.6% (preferably between 0.8% and 1.3%), and an alpha of about 2.2 or less 2.2 (preferably less than 2.1).

The above described system embodiment can have one or more of the following advantages: energy efficiency and bit rate. Electrical power consumption is a serious problem in modern data centers, and longer systems that utilized longer wavelength (≥1200 nm) light sources such as VCSELs (≥1200 nm, or ≥1260 nm, or other sources) in conjunction with the multimode optical fiber 100 would mitigate some of energy consumption problems faced by the transmission systems operating at 850 nm. In addition, there appear to be significant hurdles to increasing the speed of the systems above 35 GHz-km if the of operation wavelength of the transmission system is about 850 nm. For example, utilizing longer wavelength light sources, for example VCSELs based on In—Ga—As semiconductors, in conjunction with the multimode optical fiber 100 enables a transmission system with significantly higher transmission speeds (for example, ≥20 GHz, or ≥25 GHz, or ≥35 GHz, or even ≥40 GHz) than what is currently available.

It will be apparent to those skilled in the art that various modifications and variations can be made without departing from the spirit or scope of the claims.

What is claimed is:

1. A multimode optical fiber comprising:
   (i) a graded index glass core having a radius $R_1$ in the range of 20 microns to 50 microns, a maximum relative refractive index $\Delta_{1MAX}$ in the range between 0.5% and 3%; a graded index having a profile with (a) an alpha (α) parameter wherein 1.9≤α≤2.2, and (b) a deviation from the alpha profile in at least one region of the core, such that the difference in the relative refractive index delta of the core from that determined by the core alpha value, at the radius $R_1$ is less than 0.0015%, and
   (ii) a cladding surrounding and in contact with the core, wherein the fiber has a bandwidth greater than 5000 MHz-km at a wavelength λ where λ≥800 nm.

2. A multimode optical fiber comprising:
   (i) a graded index glass core having a diameter in the range of 40 microns to 100 microns, a maximum relative refractive index $\Delta_{1MAX}$ in the range between 0.5% and 2%; a graded index having a profile with (a) an alpha (a) parameter wherein 1.9≤α≤2.2, and (b) at least one deviation from alpha parameter B[n], where n is an integer and 1≤n≤10 and wherein and wherein for said for at least one value of n, B[n] is $0.1×10^{-4}≤|B[n]|≤7×10^{-3}$, and $$B[n] = \int_0^1 H(x') \cdot P_n(x') \cdot dx',$$

where H is a normalized non-alpha contribution to the refractive index profile, and $P_n$ are orthogonal functions; and
   (ii) a cladding surrounding and in contact with the core, wherein the fiber has a bandwidth greater than 5000 MHz-km at a wavelength λ where λ≥800 nm.

3. The multimode optical fiber according to claim 2, wherein 1≤n≤4.

4. The multimode optical fiber according to claim 3, wherein said core is constructed to have a core profile with a deviation from the alpha value in at least one region of the core, such that the difference in the refractive index delta of the core from that determined by the core alpha value, at the radius $R_1$ is less than 0.001.

5. The multimode optical fiber according to claim 3, wherein the fiber has a bandwidth greater than 7500 MHz-km at a wavelength λ where λ≥800 nm.

6. A multimode optical fiber according to claim 1, said cladding further comprises an inner annular portion surrounding and in contact with the core with relative refractive index delta $\Delta_2$, measured at the radius $R_2$ where the first derivative $d(\Delta/\Delta_{1MAX})/d(r/R_1)$, is equal to −2.5; and a depressed-index annular portion surrounding the inner annular portion.

7. The optical fiber of claim 1, wherein the fiber the fiber core has a numerical aperture NA, and 0.16<NA<0.26.

8. The optical fiber of claim 1, wherein the fiber further includes a depressed-index annular portion with a minimum relative refractive index $\Delta_{3MIN}$ less than −0.2%.

9. The optical fiber of claim 8, wherein the depressed-index annular portion has a relative minimum refractive index $\Delta_{3MIN}$ between −0.25% and −0.7% and a width of at least 1 micron.

10. The optical fiber of claim 1, wherein the core has a maximum relative refractive index $\Delta_{1MAX}$ between 0.7% and 2.0%.

11. The optical fiber of claim 1, wherein the numerical aperture of the core is the range 0.17≤NA≤0.23.

12. The optical fiber of claim 1, wherein the fiber has a bandwidth greater than 2500 MHz-km for at some wavelengths situated between 800 nm and 1100 nm.

13. The optical fiber of claim 1, said optical fiber having a bandwidth greater than 2000 MHz-km for at least some wavelengths situated between 850 nm and 1060 nm.

14. The optical fiber of claim 1, said optical fiber having bandwidth greater than 2000 MHz-km for a 200 nm wavelength band situated in a 800 nm and 1600 nm range.

15. The optical fiber of claim 1, wherein the fiber has an bandwidth greater than 5000 MHz-km some wavelengths between 800 nm and 1100 nm.

16. The optical fiber of claim 1, wherein the fiber has an bandwidth greater than 7500 MHz-km for at least some wavelengths situated in 800 nm to 1100 nm Range.

17. A multimode optical fiber comprising:
   (i) a graded index glass core having an outer radius $R_1$ in the range of 20 microns to 50 microns, a maximum relative refractive index $\Delta_{1MAX}$ in the range between 0.5% and 3%; a graded index having a profile with an alpha (α) parameter wherein 1.9≤α≤2.2 and at least one deviation from alpha profile such that the absolute difference in the refractive index delta of the core from that determined by the core alpha (α) parameter is not zero at some radial locations, and is zero at two or more radial locations, where
      one radial location where the difference in the refractive index delta is zero corresponds to a core radius r where r is 0.2 $R_1$<r<0.85 $R_1$; and
      another radial location where the difference in the refractive index delta is zero corresponds to a core radius r where r is 0.8 $R_1$<r<$R_1$, and
   (ii) a cladding surrounding and in contact with the core, wherein the fiber has a bandwidth greater than 5000 MHz-km at a wavelength λ, where λ≤800 nm.

18. A multimode optical fiber comprising:
   (i) a graded index glass core having an outer radius $R_1$ in the range of 20 microns to 50 microns, a maximum relative refractive index $\Delta_{1MAX}$ in the range between 0.5% and 3%; a graded index having a profile with
      an alpha (α) parameter wherein 1.9≤α≤2.2, and
      at least one deviation in at least one region of the core from that determined by alpha profile, said at least one deviation being determined by a parameter B[n], where n is an integer and 1≤n≤10, and B[n] has a non-zero value, such that there an absolute difference in the relative refractive index delta of the core in every region of the core corresponding to radii r where r is $0.1R_1 < r < 0.9R_1$ from that determined only by the alpha ($\alpha$) parameter is not greater than 0.002%; and (ii) a cladding surrounding and in contact with the core.

19. A system comprising:
(i) at least one light source transmitting at a bit rate of 25 GHz or higher at one or more operating wavelengths between 800 nm and 1600 nm;
(ii) at least one multimode optical fiber optically coupled to said light source, said fiber comprises a graded index a graded index glass core of 41 to 80 μm in diameter, and a cladding comprising an outer cladding portion, wherein said fiber has a bandwidth at a wavelength between 800 and 1600 nm that is greater than 2.5 GHz-km; an alpha less than about 2.04 and a deviation from the alpha profile in at least one region of the core such that
   (a) the difference in the relative refractive index delta of the core from that determined by the core alpha value, at the radius $R_1$ is less than 0.0015%: or
   (b) the absolute difference in the refractive index delta of the core from that determined by the core alpha ($\alpha$) parameter is not zero at some radial locations, and is zero at two or more radial locations; or
   (c) the absolute difference in the relative refractive index delta of the core in every region of the core corresponding to radii r where r is $0.1R_1 < r < 0.9R_1$ from that determined only by the alpha ($\alpha$) parameter is not greater than 0.002%; and (iii) a detector optically coupled to said multimode optical fiber and capable of detecting a wavelength situated between 800 nm and 1600 nm.

20. A system comprising:
(i) at least one light source transmitting at a bit rate of 25 GHz or higher at one or more operating wavelengths between 800 nm and 1600 nm;
(ii) at least one multimode optical fiber optically coupled to said light source, said fiber comprises a graded index a graded index glass core of 41 to 80 μm in diameter, and a cladding comprising an outer cladding portion, wherein said fiber has a bandwidth at a wavelength between 800 nm and 1600 nm that is greater than 2.5 GHz-km; an alpha less than about 2.04; and
(iii) a detector optically coupled to said multimode optical fiber and capable of detecting a wavelength situated between 800 nm and 1600 nm, wherein said core has a radius greater than 20 microns and less than 40 microns, a maximum relative refractive index $\Delta_{1MAX}$ between 0.6% and 2.0%, and said fiber has an bandwidth greater than 5.0 GHz-km at one or more wavelengths between 800 nm and 1600 nm.

21. A system according to claim 20, wherein said at least one light source is at least one VCSEL.

22. A system according to claim 20, wherein said at least one light source is at least one silicon-photonics laser.

* * * * *